(12) United States Patent
Kobayashi et al.

(10) Patent No.: US 12,412,474 B2
(45) Date of Patent: Sep. 9, 2025

(54) INFORMATION PROVISION SERVER, INFORMATION PROVISION METHOD, AND RECORDING MEDIUM STORING PROGRAM

(71) Applicant: NEC Corporation, Tokyo (JP)

(72) Inventors: Kosei Kobayashi, Tokyo (JP); Tetsuro Hasegawa, Tokyo (JP); Takayuki Sasaki, Tokyo (JP); Hiroaki Aminaka, Tokyo (JP); Kei Yanagisawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/032,620

(22) PCT Filed: Oct. 26, 2020

(86) PCT No.: PCT/JP2020/040040
§ 371 (c)(1),
(2) Date: Apr. 19, 2023

(87) PCT Pub. No.: WO2022/091167
PCT Pub. Date: May 5, 2022

(65) Prior Publication Data
US 2023/0394971 A1    Dec. 7, 2023

(51) Int. Cl.
*G08G 1/16* (2006.01)
*G06V 20/54* (2022.01)
*G06V 20/58* (2022.01)

(52) U.S. Cl.
CPC .............. *G08G 1/164* (2013.01); *G06V 20/54* (2022.01); *G06V 20/58* (2022.01)

(58) Field of Classification Search
CPC .... G08G 1/164; G08G 1/0112; G08G 1/0116; G08G 1/0133; G08G 1/0141; G08G 1/16; G06V 20/54; G06V 20/58
See application file for complete search history.

(56) References Cited

U.S. PATENT DOCUMENTS 10,445,599 B1 * 10/2019 Hicks ................... G06F 18/24
2006/0284760 A1    12/2006 Natsume
(Continued)

FOREIGN PATENT DOCUMENTS

JP    2002-205615 A    7/2002
JP    2005-267560 A    9/2005
(Continued)

OTHER PUBLICATIONS

JP Office Action for JP Application No. 2022-558601, mailed on Dec. 3, 2024 with English Translation.
(Continued)

*Primary Examiner* — Rodney A Butler
(74) *Attorney, Agent, or Firm* — Sughrue Mion, PLLC

(57) ABSTRACT

An information provision server includes: an determination part for determining, based on primary information acquired from an individual one of a plurality of sensors, each of which senses a predetermined range of a road, whether or not to provide secondary information created by using the primary information acquired from the plurality of sensors to a first mobile object running on the road; an information creation part for creating, if the determination part determines to provide the secondary information to the first mobile object, the secondary information by using the primary information acquired from the plurality of sensors; and a transmission part for transmitting the secondary information to the first mobile object.

20 Claims, 24 Drawing Sheets

(56) References Cited

U.S. PATENT DOCUMENTS

| | | | |
|---|---|---|---|
| 2011/0095907 A1 | 4/2011 | Kushi et al. | |
| 2018/0047287 A1* | 2/2018 | Shimotsuma | G06V 20/58 |
| 2018/0121740 A1* | 5/2018 | Boss | B60T 8/17 |

FOREIGN PATENT DOCUMENTS

| | | | |
|---|---|---|---|
| JP | 2006-349456 A | 12/2006 |
| JP | 2008-041058 A | 2/2008 |
| JP | 2010-277123 A | 12/2010 |
| JP | 2011-090582 A | 5/2011 |
| JP | 2011-138363 A | 7/2011 |
| JP | 2012-220984 A | 11/2012 |
| JP | 2019-175201 A | 10/2019 |

OTHER PUBLICATIONS

International Search Report for PCT Application No. PCT/JP2020/040040, mailed on Dec. 22, 2020.

* cited by examiner

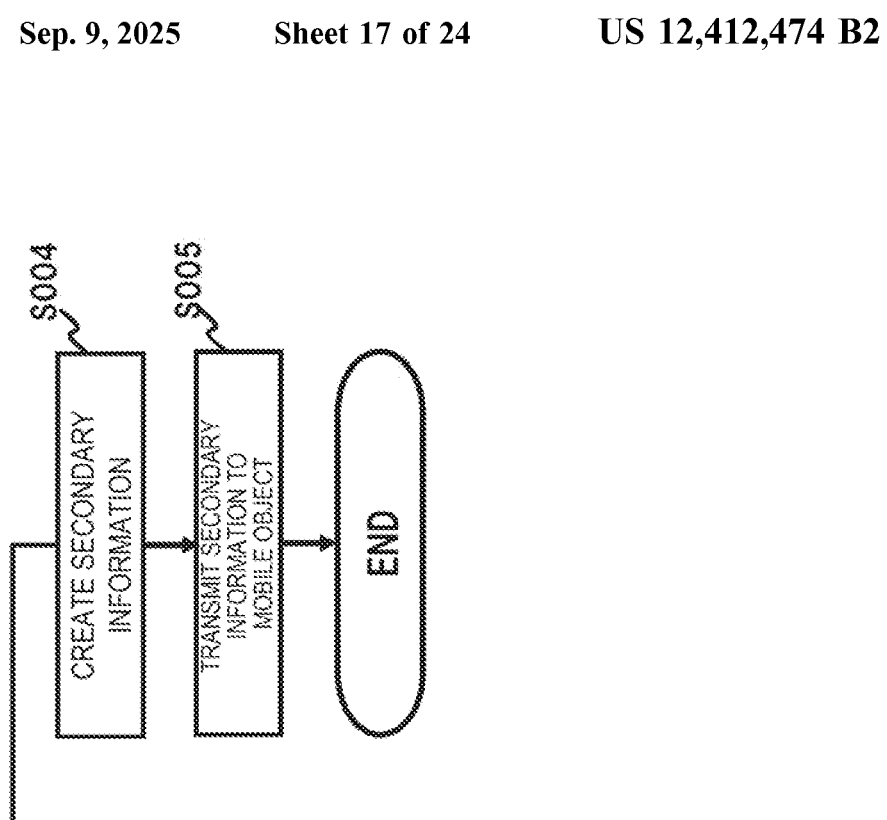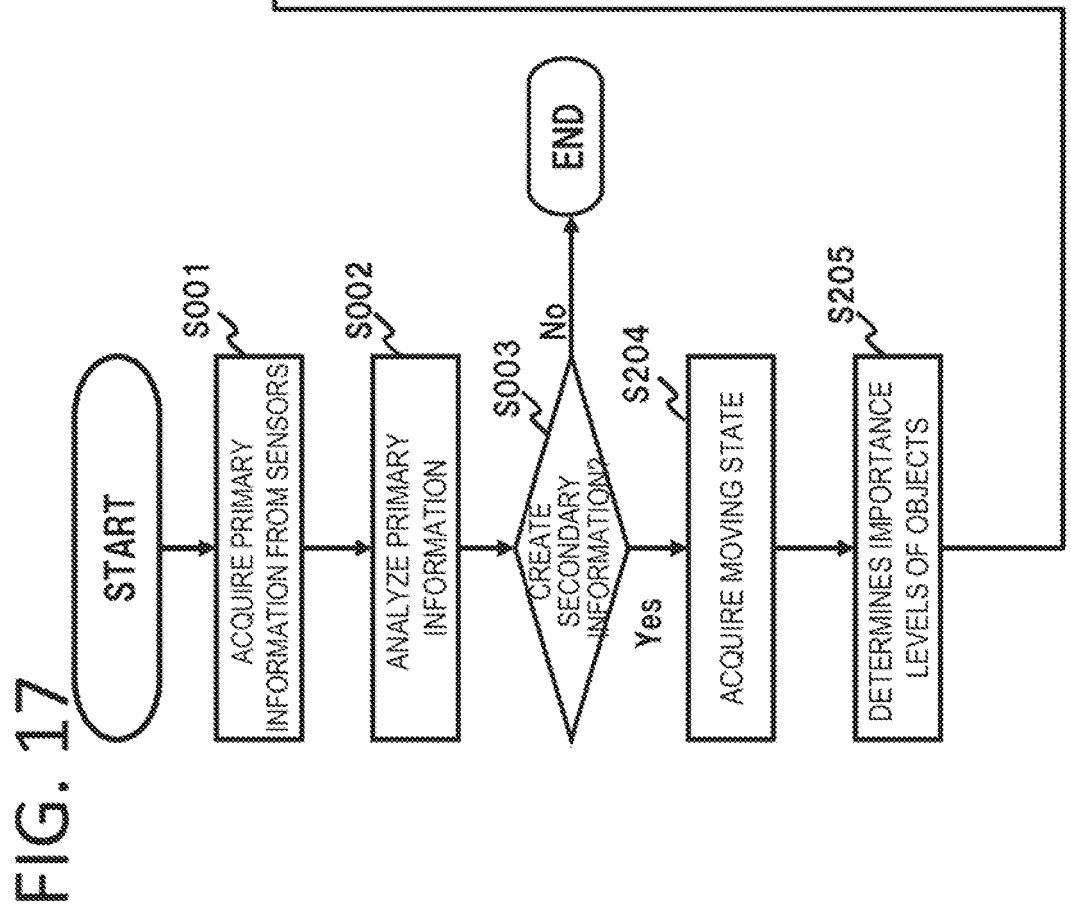
FIG. 17

INFORMATION PROVISION SERVER, INFORMATION PROVISION METHOD, AND RECORDING MEDIUM STORING PROGRAM

This application is a National Stage Entry of PCT/JP2020/040040 filed on Oct. 26, 2020, the contents of all of which are incorporated herein by reference, in their entirety.

FIELD

The present invention relates to an information provision server, an information provision method, and a recording medium storing a program.

BACKGROUND

Patent Literature (PTL) 1 discloses a notification system that can detect a blind mobile object located in a blind spot of a right-turning vehicle and can provide information to the driver of the vehicle. In the notification system disclosed in PTL 1, cameras repeatedly take images of a plurality of oncoming mobile objects running through an intersection of a road. In this notification system, of all the oncoming mobile objects, whether or not there is a blind mobile object in a blind spot of a vehicle waiting to turn right in the intersection is determined based on the taken images. The driver of the vehicle waiting to turn right in the intersection is notified of this determined blind mobile object in a blind spot.

PTL 2 discloses a right turn assistance apparatus which can reduce troublesome and complicated feeling given to the driver of a vehicle during waiting to turn right by setting assistance information about oncoming vehicles running on an oncoming road according to the running states of these oncoming vehicles. According to PTL 2, this right turn assistance apparatus sets blind spot ranks according to the relationship between the size of a preceding vehicle and the size of a vehicle following the preceding vehicle based on information about these oncoming vehicles depending on how the vehicle following the preceding vehicle is obscured by a blind spot of an oncoming preceding vehicle. Then, the right turn assistance apparatus sets the maximum value of the individual blind spot ranks as an oncoming straight ahead vehicle rank flag. In addition, based on the oncoming straight ahead vehicle rank flag and a rank flag for an oncoming vehicle turning right, the latter rank flag being set based on the size of an oncoming vehicle waiting to turn right, the right turn assistance apparatus sets an evaluation rank based on the risk of a right turn made by the own vehicle. In addition, the right turn assistance apparatus notifies of right turn assistance information based on this evaluation rank.

PTLs 3 and 4 each disclose an in-vehicle apparatus that assists the driver of a vehicle in turning right at an intersection or the like only by using sensors mounted in the vehicle without using information from roadside apparatuses or other vehicles.

PTL 1: Japanese Patent Kokai Publication No. 2008-041058
PTL 2: Japanese Patent Kokai Publication No. 2011-090582
PTL 3: Japanese Patent Kokai Publication No. 2002-205615
PTL 4: Japanese Patent Kokai Publication No. 2006-349456

SUMMARY

The following analysis has been made by the present inventors. To realize or assist safe traveling of a mobile object, it is necessary to accurately detect other mobile objects (hereinafter, surrounding mobile objects) that are present around the mobile object and that are difficult to detect by the mobile object and to notify the mobile object of information about the detected mobile objects. In addition, when the mobile object is notified of the information, the notification needs to be performed efficiently, to reduce the communication load in the radio communication network and to improve the efficiency of use of the radio resources. However, the methods described as the above background art have a problem in that it is difficult to notify a mobile object of information efficiently while maintaining the detection accuracy of the surrounding mobile objects.

The method disclosed in PTL 1 uses a configuration in which the individual camera and a processing computer are disposed on a one-to-one basis, and information obtained by the individual camera is independently supplied to the vehicle. Thus, information supplied to the vehicle by the cameras could be overlapped. In addition, since the individual cameras independently supply their information to the same vehicle, the protocol overhead increases.

According to the method disclosed in PTL 2, external information received from the outside of the vehicle, such as information from infrastructure equipment or the like, and information from in-vehicle sensors are both used to generate the right turn assistance information. However, because the information analysis is performed inside the vehicle, there is a problem in that transmitting the external information to the vehicle requires a lot of radio resources.

According to the methods disclosed in PTLs 3 and 4, because only the sensors mounted in the vehicle are used to detect the surrounding mobile objects, a surrounding mobile object(s) could not be detected.

It is an object of the present invention to provide an information provision server, an information provision method, and a recording medium storing a program, all of which contribute to both maintaining the detection accuracy of the surrounding mobile objects and efficiently notifying a mobile object of information.

According to a first aspect of the present invention, there is provided an information provision server, including: a determination part for determining, based on primary information acquired from an individual one of a plurality of sensors, each of which senses a predetermined range of a road, whether or not to provide secondary information created by using the primary information acquired from the plurality of sensors to a first mobile object running on the road; an information creation part for creating, if the determination part determines to provide the secondary information to the first mobile object, the secondary information by using the primary information acquired from the plurality of sensors; and a transmission part for transmitting the secondary information to the first mobile object.

According to a second aspect of the present invention, there is provided an information provision method in which a computer that is able to acquire primary information from a plurality of sensors, each of which senses a predetermined range of a road, determines, based on the primary information acquired from an individual one of the plurality of sensors, whether or not to provide secondary information created by using the primary information acquired from the plurality of sensors to a first mobile object running on the road; creates, if the computer determines to provide the secondary information to the first mobile object, the secondary information by using the primary information acquired from the plurality of sensors; and transmits the secondary information to the first mobile object. This method is associated with a certain machine, which is a computer capable of acquiring information from the above plurality of sensors.

According to a third aspect of the present invention, there is provided a computer program (hereinafter, a "program") for realizing the functions of the above information provision server. This program is inputted to a computer apparatus via an input device or a communication interface from the outside, is stored in a storage device, and drives a processor in accordance with predetermined steps or processing. In addition, the program can display, as needed, a processing result including an intermediate state per stage on a display device or can communicate with the outside via a communication interface. For example, the computer apparatus for this purpose typically includes a processor, a storage device, an input device, a communication interface, and as needed, a display device, which can be connected to each other via a bus. In addition, this program can be a recorded in a computer-readable (non-transitory) storage medium.

According to the present invention, it is possible to realize or assist safe traveling of mobile objects.

BRIEF DESCRIPTION OF DRAWINGS

FIG. 17 is a flowchart illustrating an operation of the information provision server according to the fourth example embodiment of the present invention.

EXAMPLE EMBODIMENTS

First, an outline of an example embodiment of the present invention will be described with reference to a drawing. Note, in the following outline, reference signs of the drawings are denoted to each element as an example for the sake of convenience to facilitate understanding and description of this outline is not intended to any limitation. An individual connection line between blocks in an individual block diagram includes both one-way and two-way directions. A one-way arrow schematically illustrates a principal signal (data) flow and does not exclude bidirectionality. A program is executed via a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner. In addition, while a port or an interface is present at an input/output connection point of an individual block in the relevant drawings, illustration of the port or the interface is omitted. In addition, in the following description, "A and/or B" signifies A or B or A and B.

Figure 1:
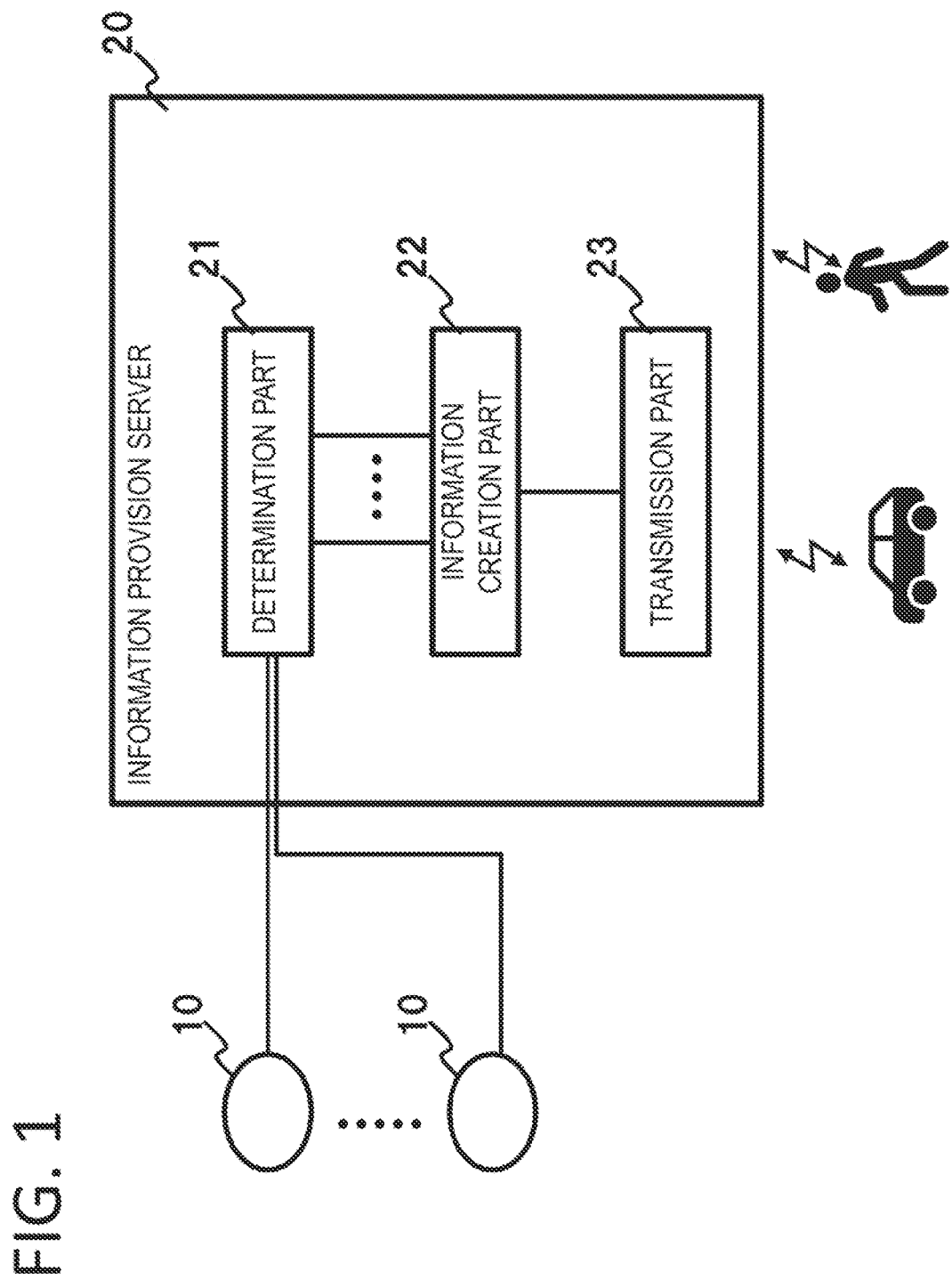
FIG. 1 is a diagram illustrating a configuration according to an example embodiment of the present invention.

As illustrated in FIG. 1, an example embodiment of the present invention can be realized by an information provision server 20 including a determination part 21, an information creation part 22, and a transmission part 23. In addition, this information provision server is connected to a plurality of sensors 10, each of which senses a predetermined range of a road, in a wired or wireless manner. The information provision server 20 can acquire data (primary information) from these sensors 10.

More concretely, the determination part 21 functions as a determination part for determining, based on the primary information acquired from an individual one of the sensors 10, whether or not to provide secondary information created by using the primary information acquired from the plurality of sensors to a first mobile object running on the road.

The information creation part 22 functions as an information creation part for creating, if the determination part 21 determines to provide the secondary information to the first mobile object running on the road, the secondary information by using the primary information acquired from the plurality of sensors.

The transmission part 23 functions as a transmission part for transmitting the secondary information to the first mobile object.

The information provision server 20 configured as described above determines whether or not to provide the secondary information created by using the primary information acquired from the plurality of sensors to the first mobile object running on the road, based on the primary information acquired from an individual one of the plurality of sensors 10.

As a result of the determination, if the determination part 21 determines to provide the secondary information to the first mobile object running on the road, the information provision server 20 creates the secondary information by using the primary information acquired from the plurality of sensors. Next, the information provision server transmits the secondary information to the first mobile object. Consequently, the first mobile object can obtain the secondary information based on the primary information acquired from an individual one of the plurality of sensors 10. Since this secondary information is created by using the primary information acquired from the plurality of sensors 10, the area around the first mobile object can be covered in a wider view. In addition, since the primary information is aggregated into the secondary information by the information provision server 20, efficient information notification is realized.

Various kinds of information may be employed as the secondary information. For example, information about a mobile object(s) that is difficult to detect by the first mobile object may be provided as the secondary information. For example, the first mobile object turning right or left at the intersection or the first mobile object running on a sharp curve may be provided with the presence or movement of a mobile object(s) located in a blind spot(s) of the first mobile object, based on the information acquired by the plurality of sensors 10. Of course, the examples of the secondary information are not limited to the above examples. For example, the secondary information may be information obtained by improving the accuracy of the primary information. By using a plurality of sensors 10 that are disposed at different locations even though they are of the same kind, more accurate sensing results than those of the sensing functions of the first mobile object can be obtained. In addition, by combining a plurality of kinds of sensors 10, more accurate secondary information can be provided. Furthermore, the first mobile object may be a person or a bicycle, other than a vehicle. For example, the secondary information based on the primary information acquired from the plurality of sensors 10 may be provided to a person or a bicycle passing through an intersection with poor visibility.

First Example Embodiment

Figure 2:
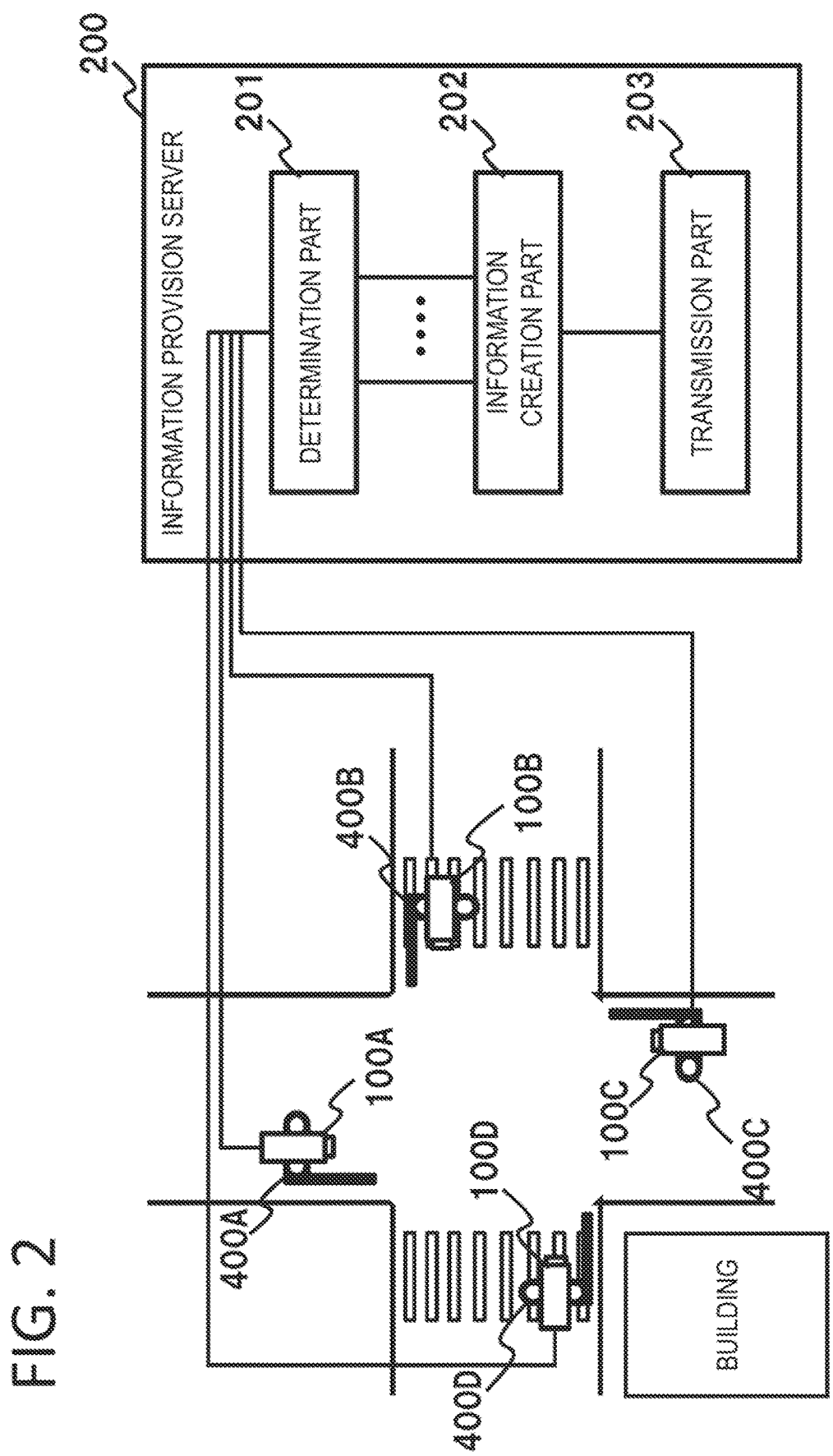
FIG. 2 is a diagram illustrating a configuration according to a first example embodiment of the present invention.

Next, a first example embodiment of the present invention will be described in detail with reference to drawings. FIG. 2 is a diagram illustrating a configuration according to the first example embodiment of the present invention. FIG. 2 illustrates an information provision server 200 connected to a camera 100A to a camera 100D as a plurality of sensors.

The camera 100A to the camera 100D are installed at traffic light machines 400A to 400D at an intersection and can transmit camera images (still images or moving images) to the information provision server 200. For example, the camera 100A is installed at a location such that the camera 100A can take the front view of the traffic on the oncoming lane of a road that crosses the intersection illustrated on the left side in FIG. 2 (the lane extending from the bottom side to the top side in FIG. 2).

Figure 3:
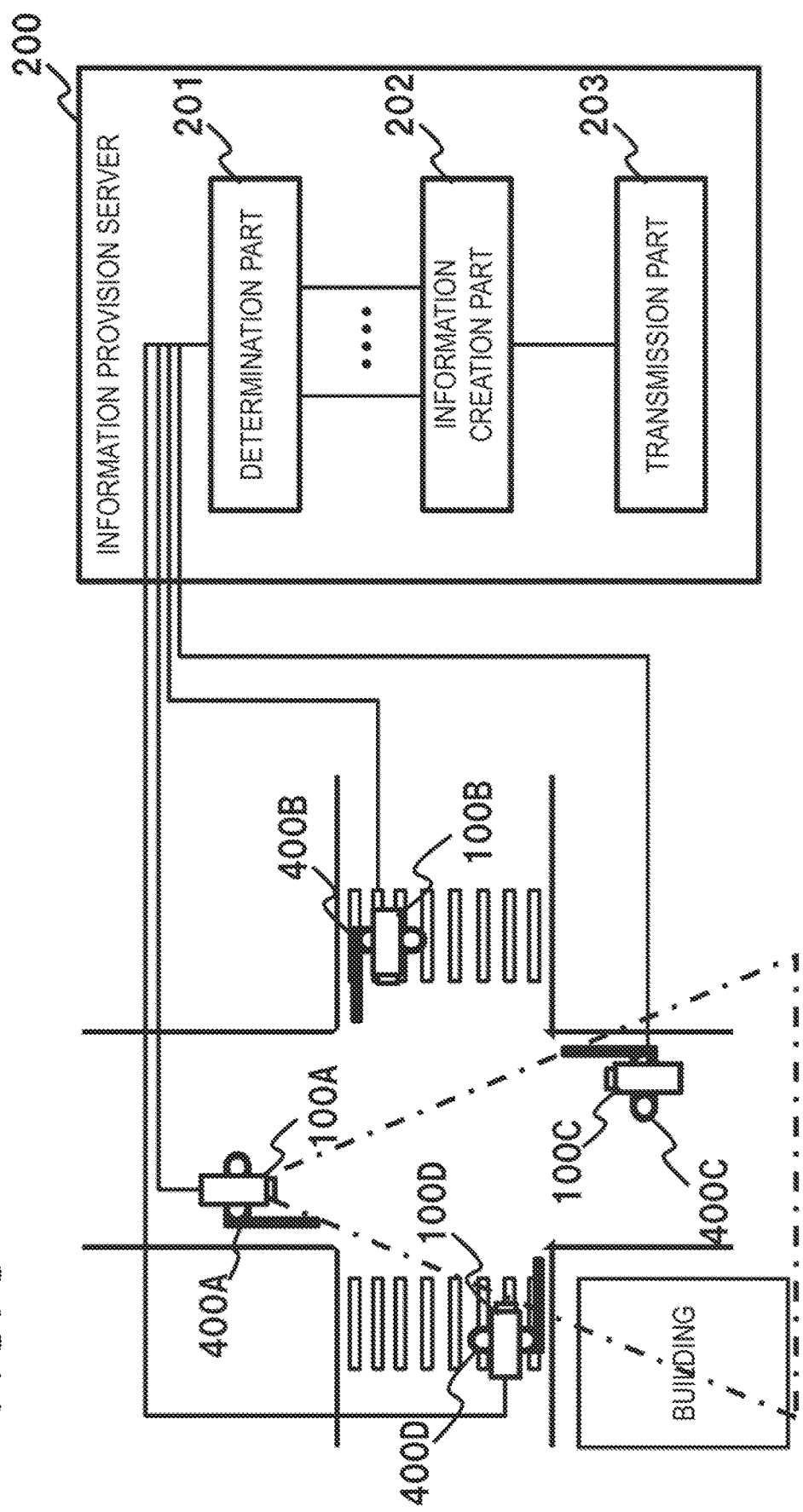
FIG. 3 is a diagram schematically illustrating the imaging range of a camera according to the first example embodiment of the present invention.

FIG. 3 is a diagram schematically illustrating the imaging range of the camera 100A. In the example in FIG. 3, the camera 100A faces in the same direction as the lights of the traffic light machine 400A and can take images in the range indicated by a dashed-dotted line in FIG. 3. Note, in FIG. 3, although the camera 100A has an approximately triangular imaging range, the depth of the range (the bottom side of the triangle indicated by the dashed-dotted line in FIG. 3) depends on the performance of the camera 100A or the imaging environment.

Figure 4:
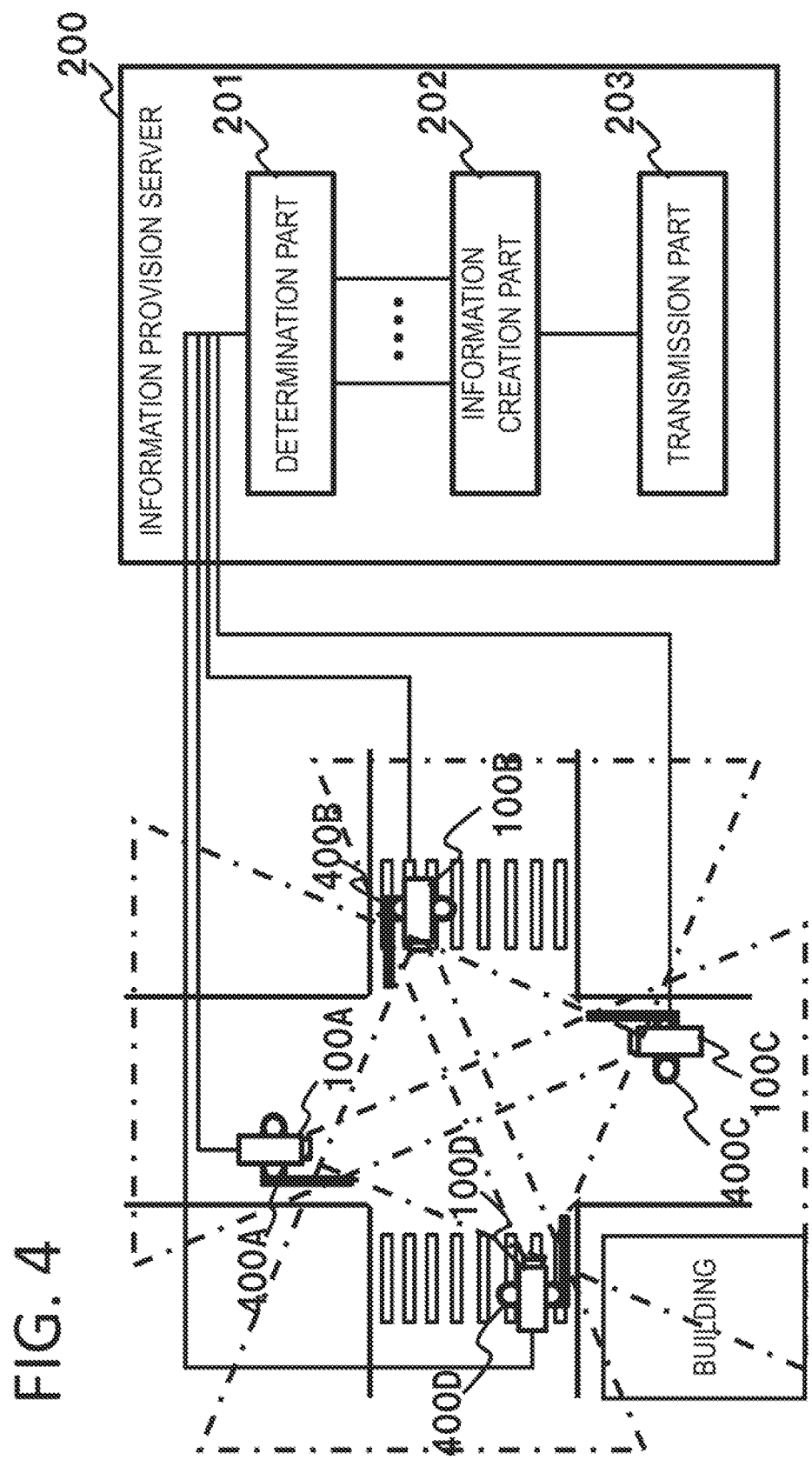
FIG. 4 is a diagram schematically illustrating the imaging ranges of cameras according to the first example embodiment of the present invention.

As illustrated in FIG. 4, the cameras 100B to 100D also have an imaging range equivalent to that of the camera 100A. By disposing the cameras 100A to 100D as described above, images of the traffic entering and exiting the intersection can be taken at various angles, and therefore, the traffic can be monitored in a planar area.

Of course, the arrangement of the cameras illustrated in FIGS. 2 to 4 is only an example. The number of cameras or the locations thereof may be changed depending on the content to be provided as the secondary information. Furthermore, sensors other than cameras may be disposed as the sensors. For example, a LiDAR (Light Detection and Ranging), a RADAR (Radio Detection And Ranging), an infrared sensor, a millimeter-wave sensor, or the like may be used or a plurality of kinds of sensors may be combined and used, in place of the camera 100A.

The information provision server 200 includes a determination part 201, an information creation part 202, and a transmission part 203.

The determination part 201 determines whether or not to provide a mobile object entering the intersection from a certain direction (for example, from the bottom side in FIG. 2) with information notifying the mobile object entering the intersection of the presence of a mobile object(s) located in a blind spot(s) as secondary information, based on camera images acquired from an individual one of the cameras 100A to 100D. Note, the presence or absence of a mobile object entering the intersection from the certain direction can be detected based on the camera image of the camera 100A. Of course, an optical beacon, an ultrasonic sensor, or the like may be installed at the target lane, and a method to detect a mobile object entering the intersection from the certain direction may be employed. Other than a vehicle, any one of various objects such as a pedestrian or a bicycle can be assumed as a mobile object to which the information provision server 200 can provide its services. However, the present example embodiment will be hereinafter described by using an example in which a mobile object to which the information provision server 200 provides its services is a vehicle.

As a method for extracting a mobile object from a camera image acquired from an individual one of the cameras 100A to 100D, for example, it is possible to use a method for extracting an object in motion as a mobile object based on comparison between a preceding image frame and a following image frame, or a difference from a prepared background image. The method for extracting a mobile object from the camera images is not limited to these methods. For example, it is possible to use a method in which high-precision three-dimensional map information (static object information) about the target area (around the intersection) may be used, and by removing static objects from the objects extracted from the camera images, a mobile object may be extracted. Various kinds of known object detection techniques, for example, techniques using deep learning techniques, may be used to extract objects from the camera images or to determine the kinds of the objects (mobile objects). Furthermore, the following description will be made assuming that the information provision server 200 according to the present example embodiment not only detects objects but also determines the kinds of mobile objects.

In addition, the determination part 201 can determine whether or not to provide the secondary information, based on the presence or absence of a mobile object(s) that is difficult to detect by the mobile object entering the intersection from the certain direction, the kind(s) of the mobile object(s), and a movement attribute(s) (movement direction and/or speed) of the mobile object(s). These methods for determining whether or not to provide the secondary information will be described below in detail with reference to concrete examples.

If it is determined to provide the secondary information to the mobile object (first mobile object), the information creation part 202 creates the secondary information notifying the mobile object (first mobile object) of the presence of a mobile object(s) located in a blind spot(s) of the mobile object (first mobile object) by using the camera images acquired from the cameras 100A to 100D. More concretely, the information creation part 202 creates the secondary information by removing overlapping information in the camera images acquired from the cameras 100A to 100D.

The transmission part 203 transmits the secondary information notifying the mobile object (the first mobile object) of the presence of a mobile object(s) located in a blind spot(s) to the mobile object (first mobile object). Note, as a method for transmitting the secondary information to the certain mobile object by the transmission part 203, it is possible to use a method in which the information is transmitted in response to a query from a communication device 000 mounted in the mobile object (an on-demand method). The transmission part 203 can transmit the secondary information to the mobile object via a radio communication network. As the radio communication network, any one of various kinds of mobile communication networks such as LTE (Long Term Evolution), 5G, local 5G, or Wi-Fi (registered trademark) may be used.

Figure 5:
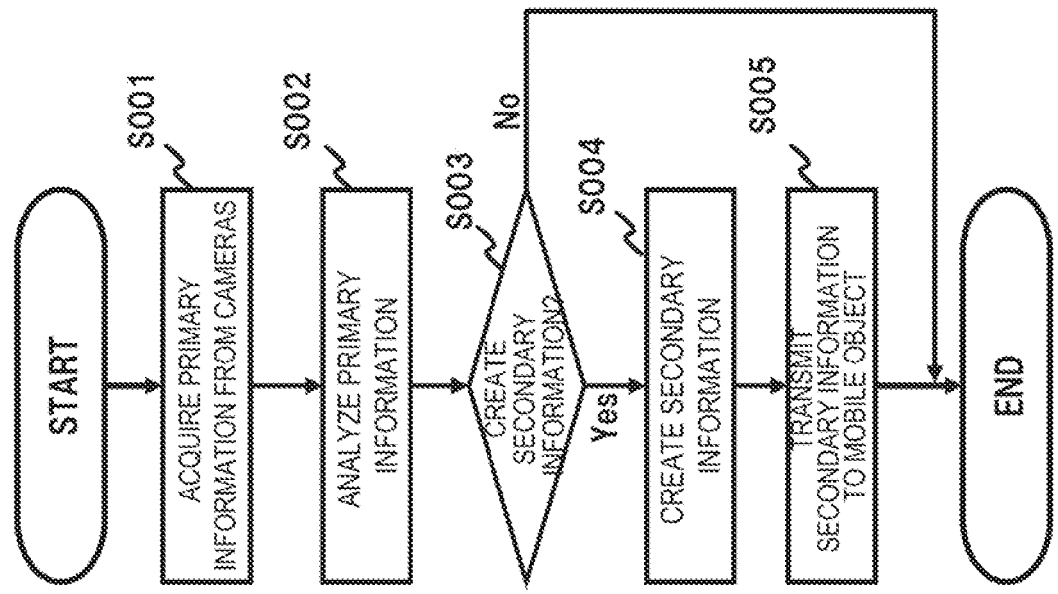
FIG. 5 is a flowchart illustrating an operation of an information provision server according to the first example embodiment of the present invention.

Next, an operation according to the present example embodiment will be described in detail with reference to the drawings. FIG. 5 is a flowchart illustrating an operation of the information provision server 200 according to the first example embodiment of the present invention. As illustrated in FIG. 5, first, the information provision server 200 acquires camera images respectively from the cameras 100A to 100D as the primary information (step S001).

Next, the information provision server 200 analyzes the camera images acquired from the cameras 100A to 100D and analyzes whether or not to provide the secondary information to the mobile object entering the intersection from a certain direction (step S002).

Figure 6:
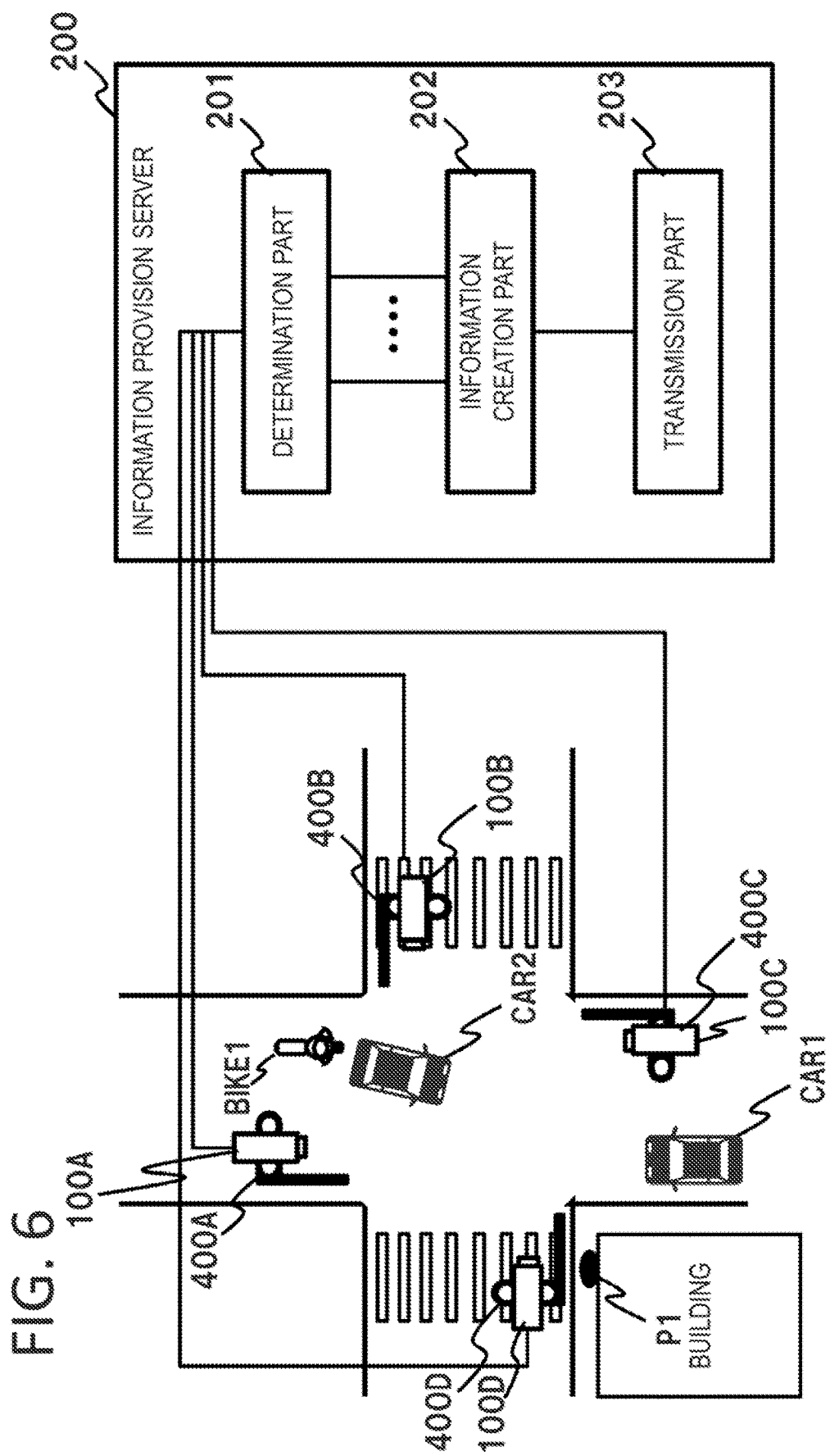
FIG. 6 is a diagram illustrating an operation of the information provision server according to the first example embodiment of the present invention.

FIG. 6 illustrates a result of an example in which the information provision server 200 analyzes the camera images acquired from the cameras 100A to 100D and extracts mobile objects. The following description assumes that a vehicle CAR1 in FIG. 6 is the mobile object (the first mobile object) entering the intersection from the certain direction. In addition, the following description assumes that the information provision server 200 has already recognized the presence of a vehicle CAR2 turning right from the oncoming lane of the lane on which the vehicle CAR1 is running, the presence of a two-wheeled vehicle BIKE1 located behind the vehicle CAR2, and the presence of a pedestrian P1 waiting for a traffic light to change in front of the bottom left building in FIG. 6.

As a result of the analysis, if it is determined to provide the secondary information to the mobile object (the first mobile object) entering the intersection (Yes in step S003), the information provision server 200 creates the secondary information to be provided to the mobile object (step S004). More concretely, the information provision server 200 creates information notifying the mobile object of the presence of the mobile objects located in the blind spots, by using the camera images acquired from the cameras 100A to 100D. Note, if, as a result of the analysis in step S002, it is determined not to provide the secondary information to the mobile object entering the intersection (No in step S003), the information provision server 200 does not perform the following steps.

Next, an example of how the information provision server 200 determines whether or not to provide the secondary information will be described.

(Method 1) For example, as a result of the analysis on the camera images (the primary information), if there is a mobile object(s) in a blind spot(s) of the first mobile object (vehicle CAR1), which is a secondary information provision target, the information provision server 200 may determine that the secondary information needs to be provided to the first mobile object. If there is not a mobile object(s) in a blind spot(s) of the first mobile object, the information provision server 200 may determine that the secondary information does not need to be provided to the first mobile object. For example, in the case in FIG. 6, because the two-wheeled vehicle BIKE1 and the pedestrian P1 are present in blind spots of the first mobile object (the vehicle CAR1), the information provision server 200 determines that the secondary information needs to be provided to the first mobile object.

(Method 2) For example, as a result of the analysis on the camera images (the primary information), if there is a mobile object(s) in a blind spot(s) of the first mobile object (vehicle CAR1), which is a secondary information provision target, and if the mobile object(s) matches a certain kind(s) (for example, a two-wheeled motor vehicle, a bicycle, a person, etc.), the information provision server 200 determines that the secondary information needs to be provided to the first mobile object. Otherwise, the information provision server 200 determines that the secondary information does not need to be provided to the first mobile object.

(Method 3) For example, as a result of the analysis on the camera images (the primary information), if there is a mobile object(s) in a blind spot(s) of the first mobile object (vehicle CAR1), which is a secondary information provision target, and if this mobile object(s) is approaching the first mobile object (vehicle CAR1) or if this mobile object(s) is stopped, the information provision server 200 determines that the secondary information needs to be provided to the first mobile object. In contrast, if the mobile object(s) in the blind spot(s) of the first mobile object (vehicle CAR1) is moving away from the first mobile object (vehicle CAR1), the information provision server 200 may determine that the secondary information does not need to be provided to the first mobile object. In this method 3, whether or not to provide the secondary information may be determined in view of the speeds of the individual mobile objects. For example, if the moving speed of a mobile object is less than or equal to a predetermined value, the information provision server 200 may perform the determination on the assumption that the mobile object is stopped, regardless of the movement direction of the mobile object. As described above, it is possible to use a method to determine whether or not to provide the secondary information by using a movement attribute(s) of a mobile object(s).

Figure 7:
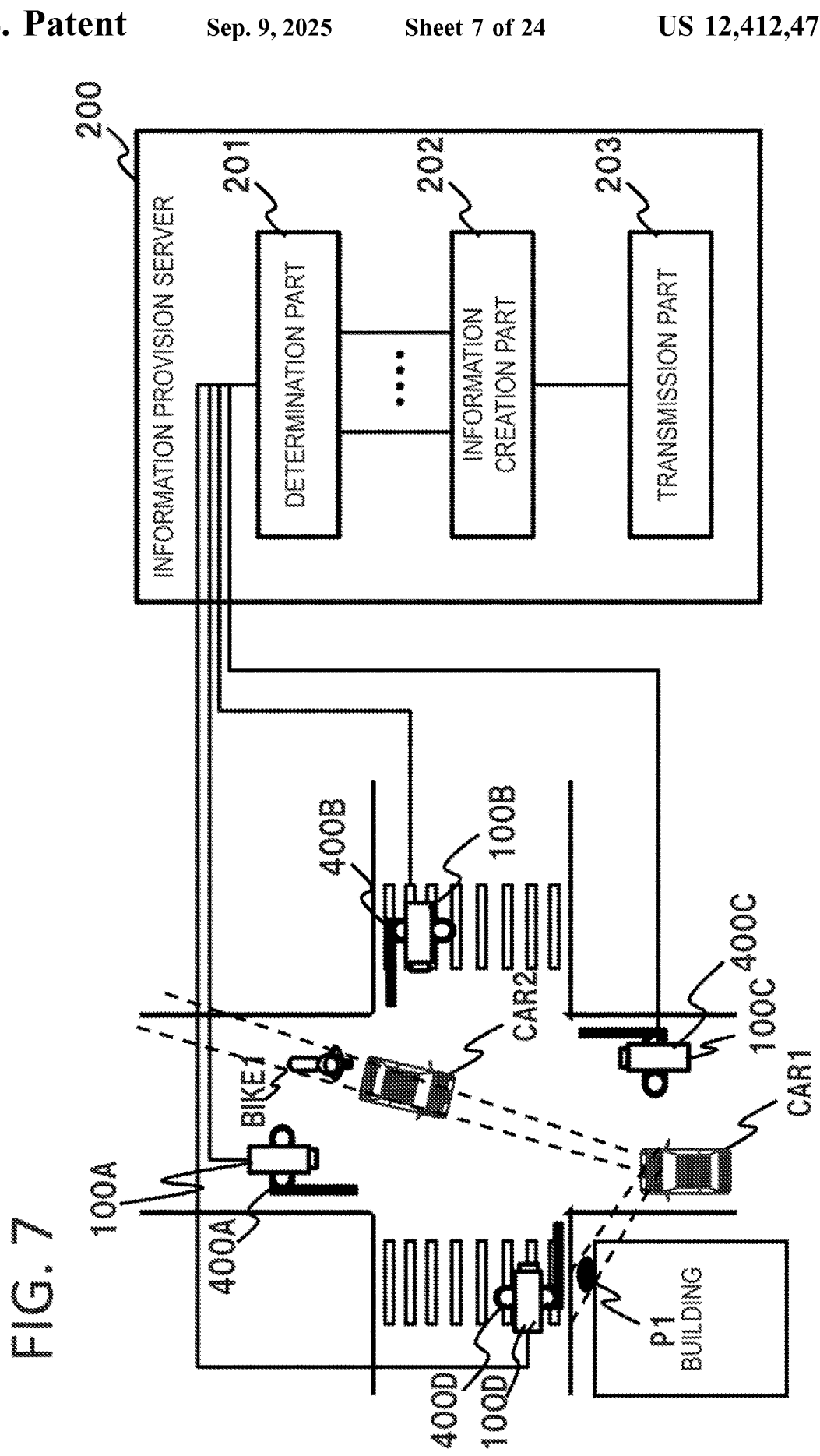
FIG. 7 is a diagram illustrating an operation of the information provision server according to the first example embodiment of the present invention.

Furthermore, in the above methods 1 to 3, whether or not there is a mobile object(s) in a blind spot(s) can be determined by the following method. First, based on information about the location of the first mobile object (vehicle CAR1) and information about a peripheral mobile object(s) (an object(s)) (and map information about the peripheral area), the information provision server 200 determines whether or not each mobile object(s) is located in a blind spot(s) based on whether or not there exists another mobile object(s) or a structure(s) on a straight line connecting the first mobile object (vehicle CAR1) and each mobile object. For example, as illustrated in FIG. 7, on a map representing the overall situation of the intersection, the information provision server 200 draws two virtual lines (dashed lines) connecting the locations of sensors of the vehicle CAR1 and edges of a mobile object. Next, if there is another mobile object or structure on both or one of the virtual lines (dashed lines), the information provision server 200 may determine that the mobile object is located in a blind spot of the first mobile object (vehicle CAR1). For example, in the case of the two-wheeled vehicle BIKE1 in FIG. 7, because there is another mobile object (vehicle CAR2) on the two virtual lines (dashed lines), the information provision server 200 determines that the BIKE1 is located in a blind spot of the first mobile object (vehicle CAR1). Likewise, for example, in the case of the pedestrian P1 in FIG. 7, because there is a structure (the bottom left "building" in FIG. 7) on the virtual lines (dashed lines), the information provision server 200 determines that the pedestrian P1 is located in a blind spot of the first mobile object (vehicle CAR1). In contrast, in the case of the vehicle CAR2 in FIG. 7, because there are no other mobile objects or structures on the virtual lines (dashed lines), the information provision server 200 determines that the vehicle CAR2 is not located in a blind spot of the first mobile object (vehicle CAR1). The method for determining whether or not there is a mobile object(s) in a blind spot(s) is not limited to the above example. Any one of various methods may be adopted. For example, instead of drawing the two virtual lines (dashed lines) as illustrated in FIG. 7, the information provision server 200 may draw a virtual line (dashed line) from the center location of a mobile object to the center location of another mobile object. It is possible to simply determine that the another mobile object is located in a blind spot if there is another mobile object or structure on the virtual line in between. In addition, in the above description, "blind spot" has been described as a blind spot of a camera mounted in the first mobile object (vehicle CAR1). However, "blind spot" is not limited to this example. For example, a blind spot of "the driver's viewpoint" may be assumed. In addition, "blind spot" is not limited to a blind spot based on visible light. "Blind spot" may be a blind spot of a LiDAR, a RADAR, or the like, depending on the kind of a sensor mounted in the first mobile object (vehicle CAR1). In the above methods 1 to 3, the first mobile object (vehicle CAR1) may transmit a query message including location information of the first mobile object (vehicle CAR1) to the information provision server 200.

Finally, the information provision server 200 transmits the created secondary information to the first mobile object (step S005). For example, from a query message transmitted from the first mobile object (vehicle CAR1), the information provision server 200 determines the communication address of the transmission source and transmits the secondary information to the communication address. In this way, the information provision server 200 can transmit the secondary information to the vehicle CAR1.

Figure 8:
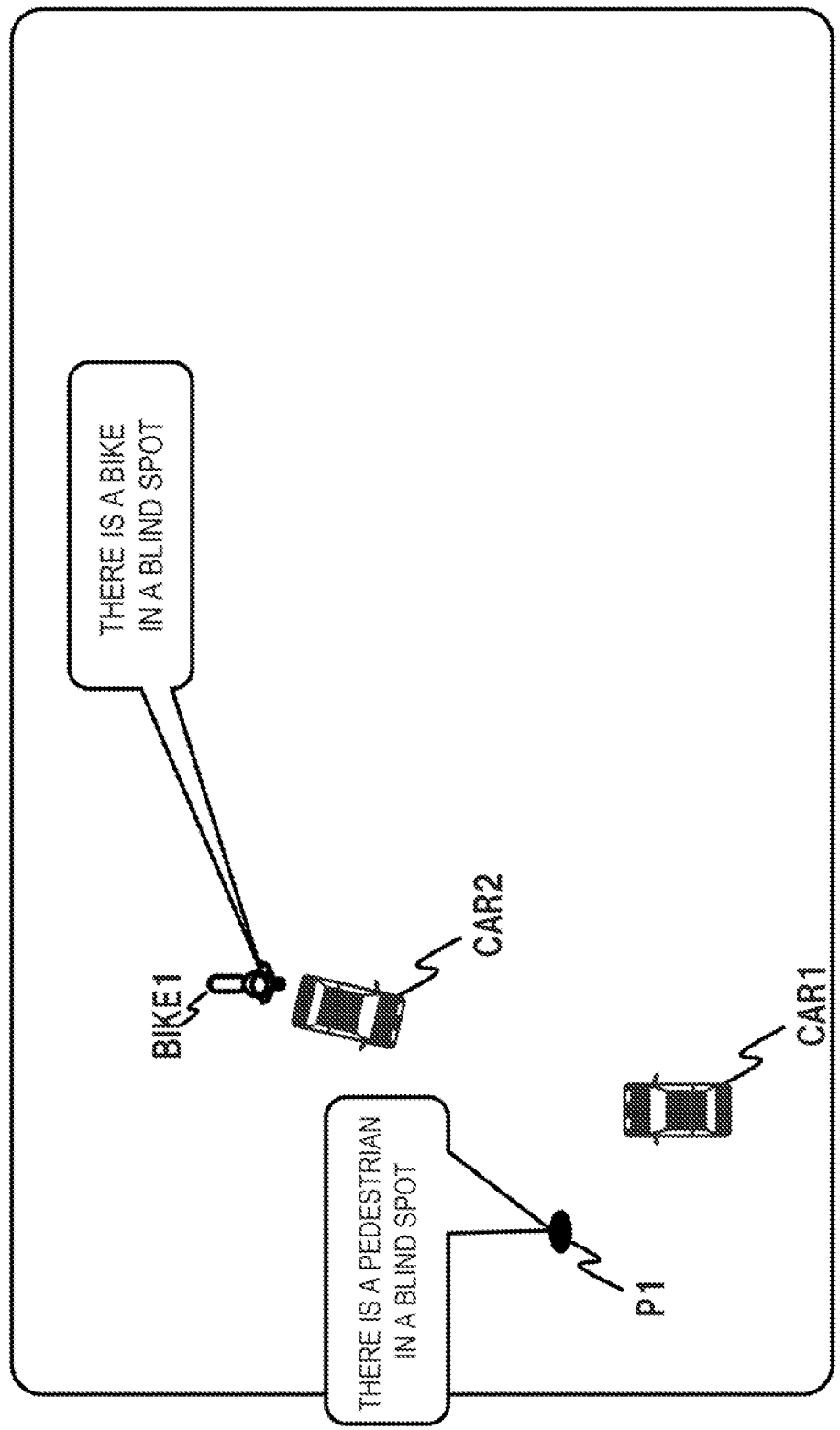
FIG. 8 is a diagram illustrating an example of secondary information provided from the information provision server to a vehicle according to the first example embodiment of the present invention.

Next, examples of the secondary information created in step S004 and provided to the vehicle in step S005 will be described. FIG. 8 illustrates an example of the secondary information that the information provision server 200 provides to the vehicle CAR1 which is the first mobile object in FIG. 6. In the example in FIG. 8, the secondary information is provided as information for alerting the driver of the vehicle CAR1, by displaying the locational relationship between the pedestrian P1 and the two-wheeled vehicle BIKE1 located in the blind spots of the vehicle CAR1 on a screen in which the vehicle CAR1 is present. Such a locational relationship may be provided by superimposing the locational relationship on a map. Note, the provision mode of the secondary information is not limited to the example illustrated in FIG. 8. For example, the first mobile object (vehicle CAR1) may be notified of the presence of the two-wheeled vehicle BIKE1 and the presence of the pedestrian P1 located in blind spots of the first mobile object (vehicle CAR1) by voice. Alternatively, the secondary information may be interpretable by an in-vehicle terminal (including being a driving assistance device) in the first mobile object (vehicle CAR1). For example, instead of appealing to the human vision by disposing speech balloons including comments as illustrated in FIG. 8 or appealing to the human hearing by using voice, the secondary information may be provided in the interpretable form by an in-vehicle terminal in the first mobile object (vehicle CAR1).

The information indicating the locational relationship illustrated in FIG. 8 may be created by the following method. First, the information provision server 200 determines the same mobile object in the camera images taken by the cameras 100A to 100D and removes the overlap. For example, if a plurality of mobile objects of the same kind and/or the same size are detected by a plurality of cameras at the same time and the same location, the information provision server 200 determines that these mobile objects are the same mobile object. In addition, the information provision server 200 creates secondary information indicating the locational relationship between the first mobile object (vehicle CAR1) and the object that is determined to be the same. Because the vehicle CAR2 in FIG. 8 is an object that can be detected by the first mobile object (vehicle CAR1), the vehicle CAR2 may be excluded from the information included in the secondary information. In this way, the overlapping objects and unnecessary objects in the camera images taken by the cameras 100A to 100D are removed. When secondary information may be provided in the interpretable form by an in-vehicle terminal in the first mobile object (vehicle CAR1) is provided, too, the same mobile objects are determined and the overlap is removed, and the mobile objects that have been detected by the first mobile object (vehicle CAR1) are removed, to create the secondary information.

In another method for creating the secondary information, information about a plurality of mobile objects that are present in blind spots of the first mobile object (vehicle CAR1) can be aggregated to a single message or a single IP packet, and then, the single message or the single IP packet can be transmitted to the first mobile object (vehicle CAR1). If each camera independently transmits information by an IP packet to the first mobile object (vehicle), the ratio of the IP headers with respect to the entire transmission data increases because an IP header is given to each IP packet. In contrast, if the information provision server 200 aggregates information into a single IP packet and transmits this single IP packet, the ratio of the IP headers with respect to the entire transmission data can be reduced. In addition, if the information provision server 200 aggregates and transmits information, an effect to alleviate the mobile communication network signaling load in establishing radio links and allocating radio resources is expected in comparison with a case in which each camera independently transmits information to the first mobile object (vehicle).

Figure 9:
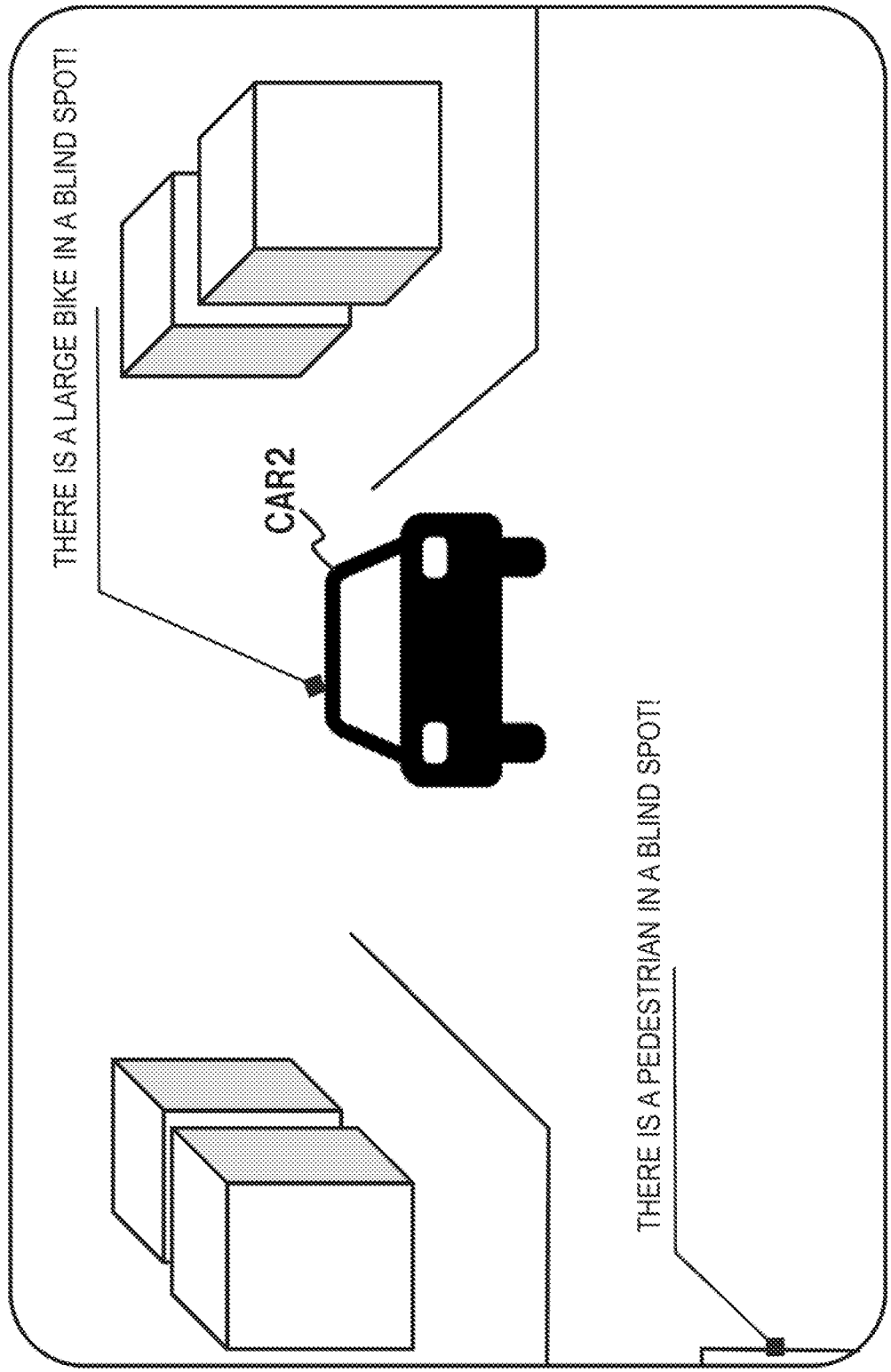
FIG. 9 is a diagram illustrating another example of the secondary information provided from the information provision server to a vehicle according to the first example embodiment of the present invention.
Figure 10:
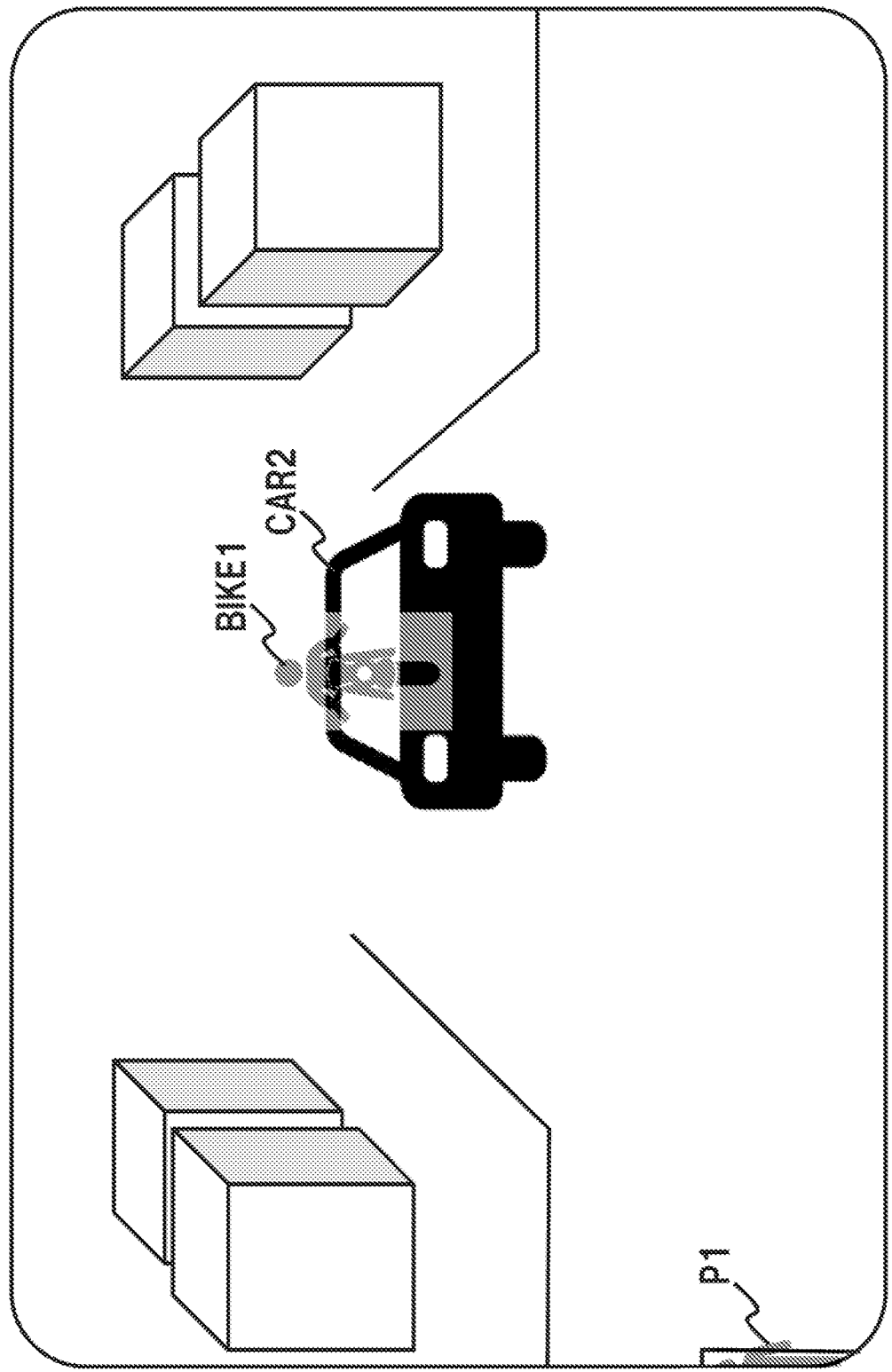
FIG. 10 is a diagram illustrating another example of the secondary information provided from the information provision server to a vehicle according to the first example embodiment of the present invention.

The secondary information created as described above is used in various modes in the first mobile object (vehicle CAR1). For example, by transmitting the secondary information to an in-vehicle terminal or a smartphone in the first mobile object (vehicle CAR1) and displaying the secondary information on such a device, the secondary information can be presented to the driver. Alternatively, AR (Augmented Reality) may be displayed on the windshield of the first mobile object (vehicle CAR1). FIGS. 9 and 10 illustrate examples in which the secondary information is presented on one of the above terminals and the windshield. For example, in the example in FIG. 9, messages indicating the presence of the two-wheeled vehicle BIKE1 and the presence of the pedestrian P1 behind the vehicle CAR2 and the building viewed as real images are displayed. In the example in FIG. 10, objects representing the two-wheeled vehicle BIKE1 and the pedestrian P1 are displayed in AR behind the vehicle CAR2 and the building viewed as real images. By using the secondary information as described above, the driver of the first mobile object (vehicle) can be accurately notified that the two-wheeled vehicle BIKE1 and the pedestrian P1 are located in the blind spots. The objects (BIKE1 and P1) in FIG. 10 may be icons or frontal views estimated from the lateral images (primary information) of the bike and the pedestrian obtained from the camera 100B. Alternatively, the speeds estimated from the camera images or the distances from the CAR1 may be displayed on these objects.

The secondary information may be used in different ways, other than appealing to the vision of the driver. For example, the secondary information may be entered to an in-vehicle terminal in the first mobile object (vehicle CAR1) and used as information for self-driving or as driving assistance information. For example, the secondary information may also be provided as information for complementing a dynamic map for self-driving.

As described above, according to the present example embodiment, it is possible to efficiently transmit accurate secondary information to the first mobile object (vehicle) entering an intersection from a certain direction. This is because whether or not to create the secondary information is determined by using the primary information acquired from the cameras 100A to 100D and the secondary information is created by removing the overlap.

Figure 11:
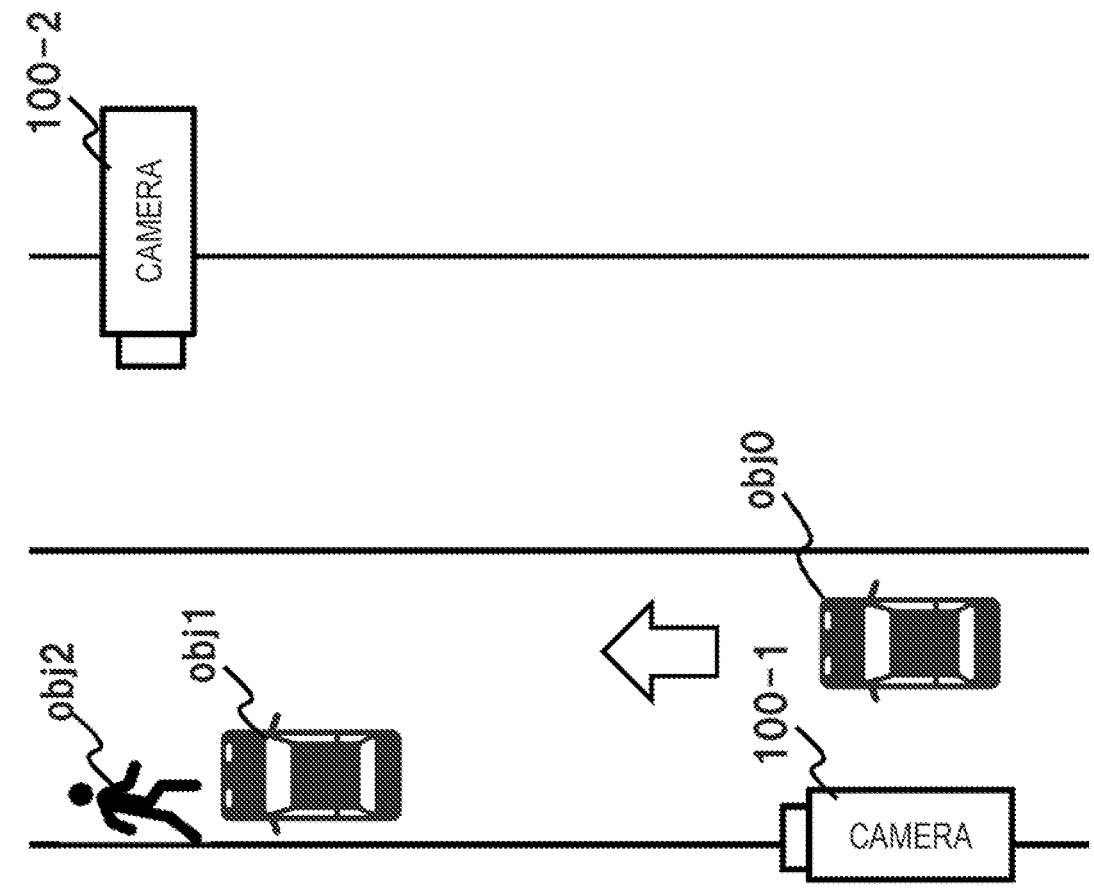
FIG. 11 is a diagram illustrating another example of the secondary information that can be provided by an information provision server according to the present invention.
Figure 12:
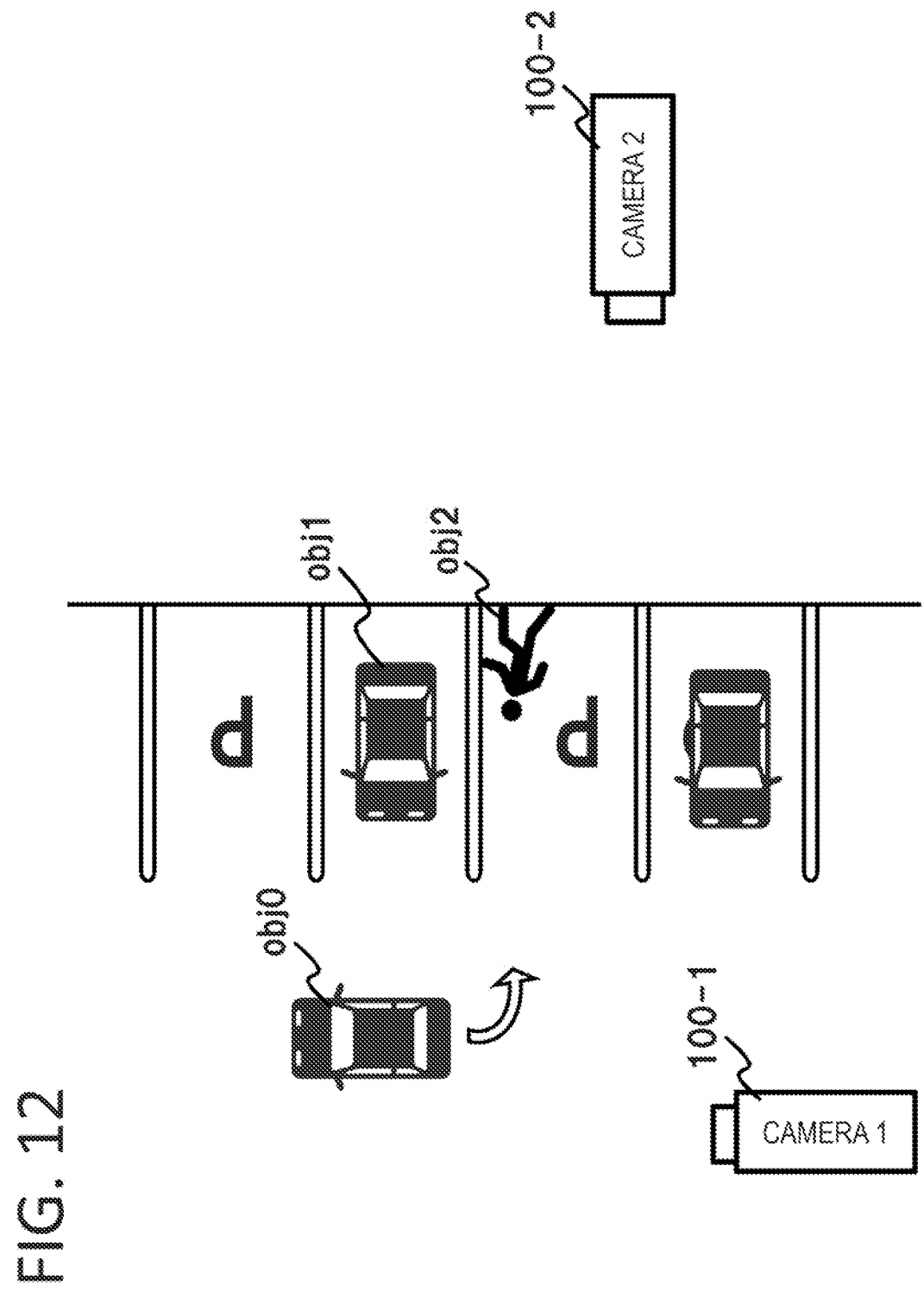
FIG. 12 is a diagram illustrating another example of the secondary information that can be provided by an information provision server according to the present invention.

The above first example embodiment has been described based on an example in which the secondary information is provided to the first mobile object (vehicle) entering an intersection from a certain direction. However, the scene to which the present invention is applicable is not limited to this example only. For example, as illustrated in FIG. 11, there is a case in which an image obj2 (a pedestrian in the case in FIG. 11) of a mobile object (second mobile object) is located in a blind spot of a sensor or the like of a vehicle obj0 because of the presence of a parked vehicle obj1. In this case, the secondary information may be used to notify the first mobile object (vehicle obj0) of the presence of the mobile object (second mobile object) located in the blind spot of the sensor or the like. In addition, for example, as illustrated in FIG. 12, there is a case in which a pedestrian obj2 who cannot be accurately detected by a sensor of a vehicle obj0 is located because of the presence of a parked vehicle obj1 in a parking lot. In this case, the secondary information may be used to notify the vehicle obj0 of the presence of the pedestrian obj2. The first mobile object may be a pedestrian or a bicycle, other than a vehicle. As described above, the present invention is widely applicable to notifying a person(s) of a second mobile object that is present around a certain first mobile object and that is difficult to detect by the first mobile object.

Second Example Embodiment

Figure 13:
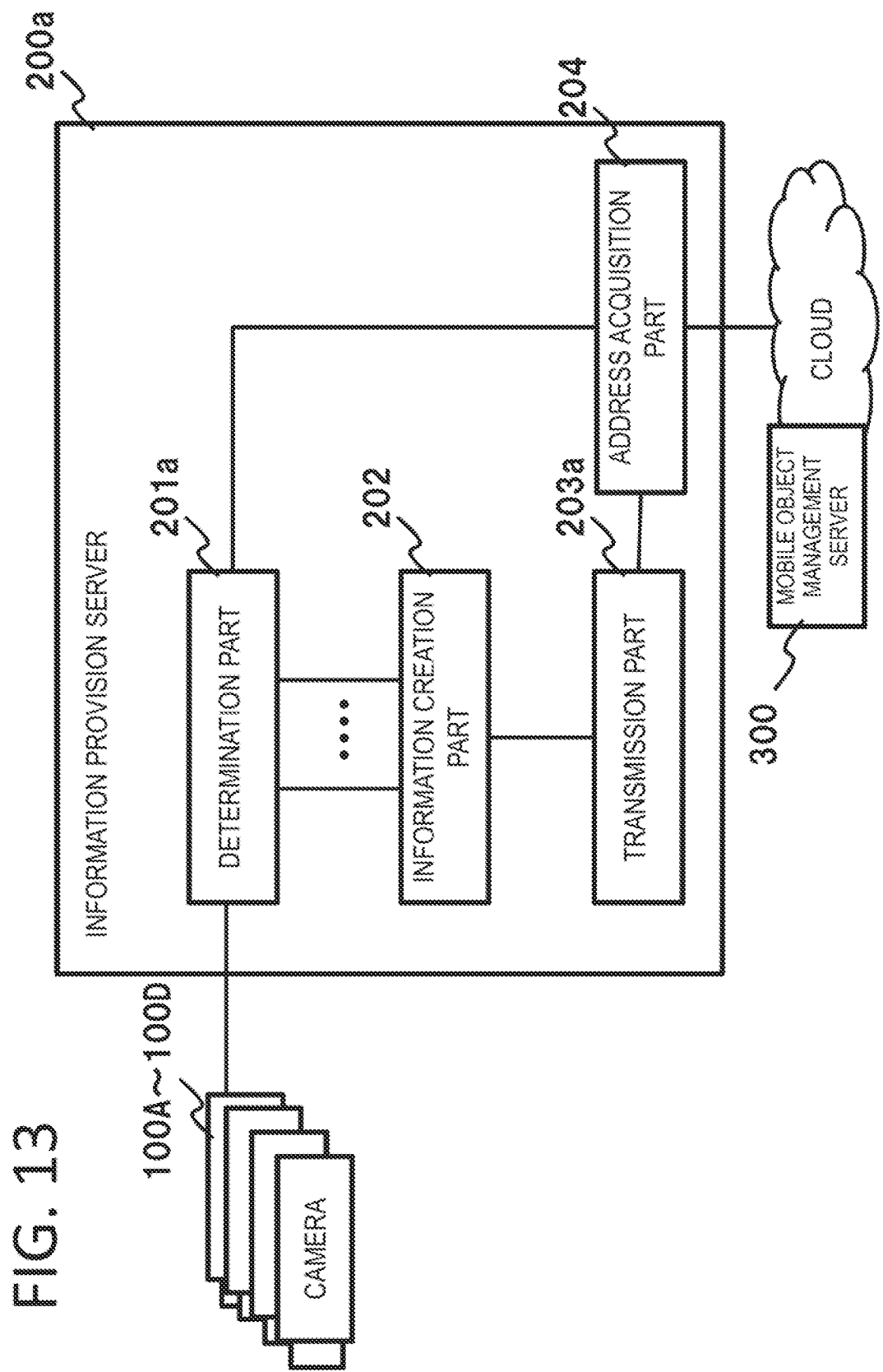
FIG. 13 is a diagram illustrating a configuration of an information provision server according to a second example embodiment of the present invention.

Next, a second example embodiment in which the method for transmitting information to a certain mobile object is changed will be described in detail with reference to drawings. According to the second example embodiment, too, a mobile object to which the information provision server 200a provides its services could be any one of various objects such as a pedestrian or a bicycle, other than a vehicle. However, the following description will be made based on an example in which a service target mobile object is a vehicle. FIG. 13 is a diagram illustrating a configuration of an information provision server according to the second example embodiment of the present invention. The present configuration differs from the configuration according to the first example embodiment illustrated in FIG. 2 in that an information provision server 200a further includes an address acquisition part 204 and that functions of a determination part 201a and a transmission part 203a are changed. Because other aspects of the configuration are the same as those according to the first example embodiment, the following description will be made with a focus on the difference.

The determination part 201a provides camera images (primary information) acquired from the cameras 100A to 100D to the address acquisition part 204.

The address acquisition part 204 performing individual identification of a mobile object (vehicle) by reading license plate information from an image of the mobile object (vehicle) in at least one of the camera images (primary information) acquired from the cameras 100A to 100D. Then, the address acquisition part 204 transmits the license plate information to a mobile object management server 300 disposed on the cloud and requests the IP (Internet Protocol) address of an in-vehicle terminal in the mobile object (vehicle) having the e corresponding license plate information.

The mobile object management server 300 is a server that manages mobile object information in which license plate information is associated with the IP addresses of in-vehicle terminals, etc., in individual mobile objects (vehicles). Upon receiving a request for an IP address corresponding to license plate information from the information provision server 200a, the mobile object management server 300 responds the IP address to the information provision server 200a.

By using the acquired IP address, the transmission part 203a transmits information indicating the presence of another mobile object located in a blind spot to the mobile object (vehicle).

Figure 14:
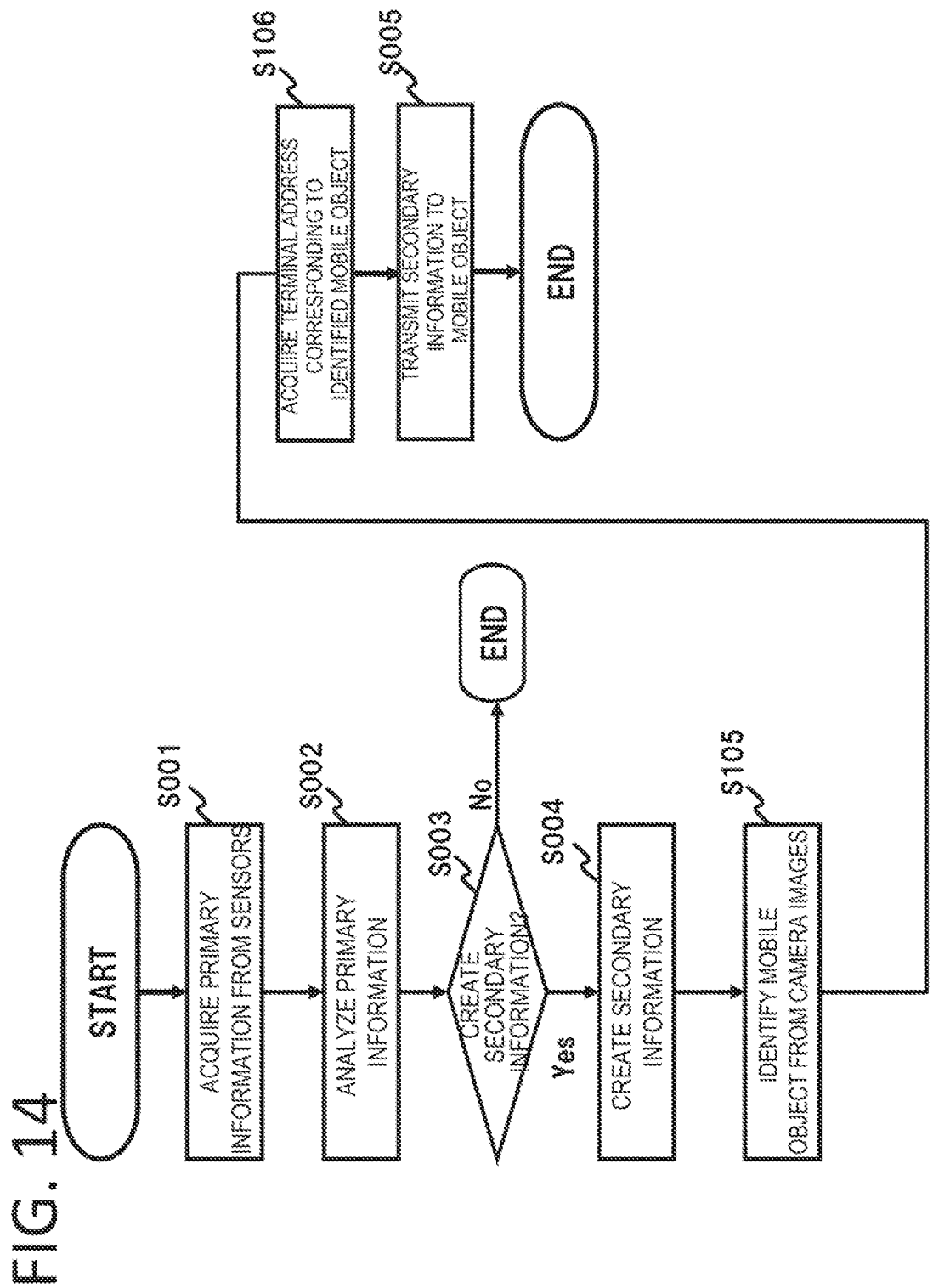
FIG. 14 is a flowchart illustrating an operation of the information provision server according to the second example embodiment of the present invention.

Next, an operation according to the present example embodiment will be described in detail with reference to drawings. FIG. 14 is a flowchart illustrating an operation of the information provision server 200a according to the second example embodiment of the present invention. The present operation differs from the operation according to the first example embodiment illustrated in FIG. 5 in that steps S105 and S106 are added after step S004.

After creating the secondary information to be provided to the first mobile object (vehicle) (step S004), the information provision server 200a reads license plate information from an image of the first mobile object (vehicle) in the images (primary information) acquired from the cameras 100A to 100D and identifies the first mobile object (vehicle) (step S105).

The information provision server 200a acquires the IP address of an in-vehicle terminal or the like in the identified first mobile object (vehicle) from the mobile object management server 300 disposed on the cloud (step S106).

Finally, the information provision server 200a transmits the secondary information created in step S004 to the first mobile object (vehicle) by using the acquired IP address (step S005).

Thus, as described above, according to the present example embodiment, a communication address can be identified without receiving a query message, and the first mobile object can be notified of information. In addition, according to the present example embodiment, even if an in-vehicle terminal or the like in the first mobile object does not have a secondary information request function, information can be transmitted to the first mobile object. In other words, in addition to the advantageous effects according to the first example embodiment, the present example embodiment is also advantageous in that the function of an in-vehicle terminal or the like can be simplified.

In addition, in the second example embodiment as described above, it is described that license plate information is read from at least one of the camera images acquired from the cameras 100A to 100D and an address of an in-vehicle terminal or the like is identified. However, the method for identifying an address of an in-vehicle terminal or the like in the first mobile object is not limited to this method. For example, if there is a server in which facial images of people are associated with addresses on the cloud, it is possible to adopt a method in which a driver may be identified from a facial image in at least one of the camera images acquired from the cameras 100A to 100D, and an address of a terminal in the first mobile object may be identified by querying the server. This method is advantageous in that, other than people in vehicles, general pedestrians and people riding bicycles can be provided with the secondary information.

Concretely, a server in which facial images of people are associated with addresses of information terminals possessed by the people is disposed on the cloud. Then, the information provision server 200a queries the server about the address of an information terminal possessed by a person corresponding to one of the facial images. In this way, the present invention becomes applicable not only to a case in which the information transmission destination is a vehicle but also to a case in which the transmission destination is a pedestrian or a person riding a bicycle.

Third Example Embodiment

Figure 15:
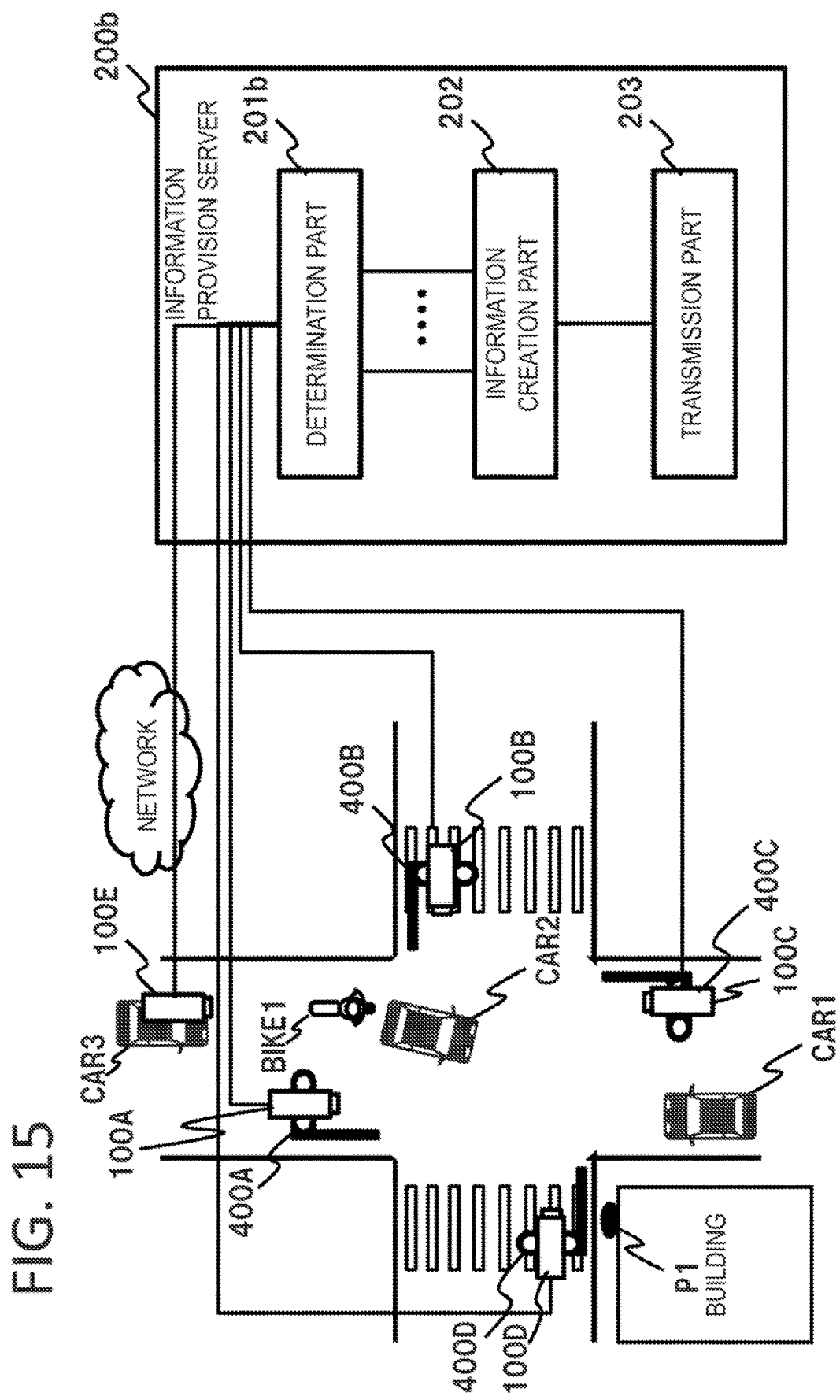
FIG. 15 is a diagram illustrating a configuration of an information provision server according to a third example embodiment of the present invention.

Next, a third example embodiment in which a camera mounted in a mobile object is used as one of the sensors according to the above example embodiments as described above will be described in detail with reference to drawings. According to the third example embodiment, too, the mobile objects to which an information provision server 200b provides its services and mobile objects which acquires camera images could be various objects such as pedestrians and bicycles, other than vehicles. However, the following description will be made based on an example in which these mobile objects are vehicles. FIG. 15 is a diagram illustrating a configuration of an information provision server according to the third example embodiment of the present invention. The present configuration differs from the configuration according to the first example embodiment illustrated in FIG. 2 in that a determination part 201b of the information provision server 200b can acquire a camera image from a camera 100E mounted in a passing surrounding mobile object via a network. Because other aspects of the configuration are the same as those according to the first example embodiment, the following description will be made with a focus on the difference.

The determination part 201b of the information provision server 200b acquires a camera image from the camera 100E mounted in at least one passing mobile object around the intersection via a network. The determination part 201b can identify the acquisition location of the image from metadata such as EXIF information, or the like, given to the camera image. In addition or alternatively, the network may be provided with a function of transmitting the camera image to the information provision server 200b based on the locational information about the mobile object such that the camera image is automatically transmitted from the mobile object running toward the intersection to the information provision server 200b.

As described above, the information provision server 200b according to the present example embodiment can acquire, as the primary information, an image from the camera 100E mounted in at least one passing mobile object around the intersection. In this way, for example, as illustrated in FIG. 15, an image can be acquired from a vehicle CAR3 running behind the mobile object (second mobile object) BIKE1 located in a blind spot of the first mobile object (vehicle CAR1).

As described above, according to the present example embodiment in which a camera of a surrounding mobile object is used as a sensor, the accuracy in determining whether or not to create the secondary information can be improved, and information to be included in the secondary information is increased. In particular, if fixed cameras such as the cameras 100A to 100D installed at roads are used, these cameras could take images against the sun due to a position of the sun, and quality of the images could be deteriorated. However, by using the camera 100E, the deterioration of the determination accuracy, etc., can be prevented.

Fourth Example Embodiment

Figure 16:
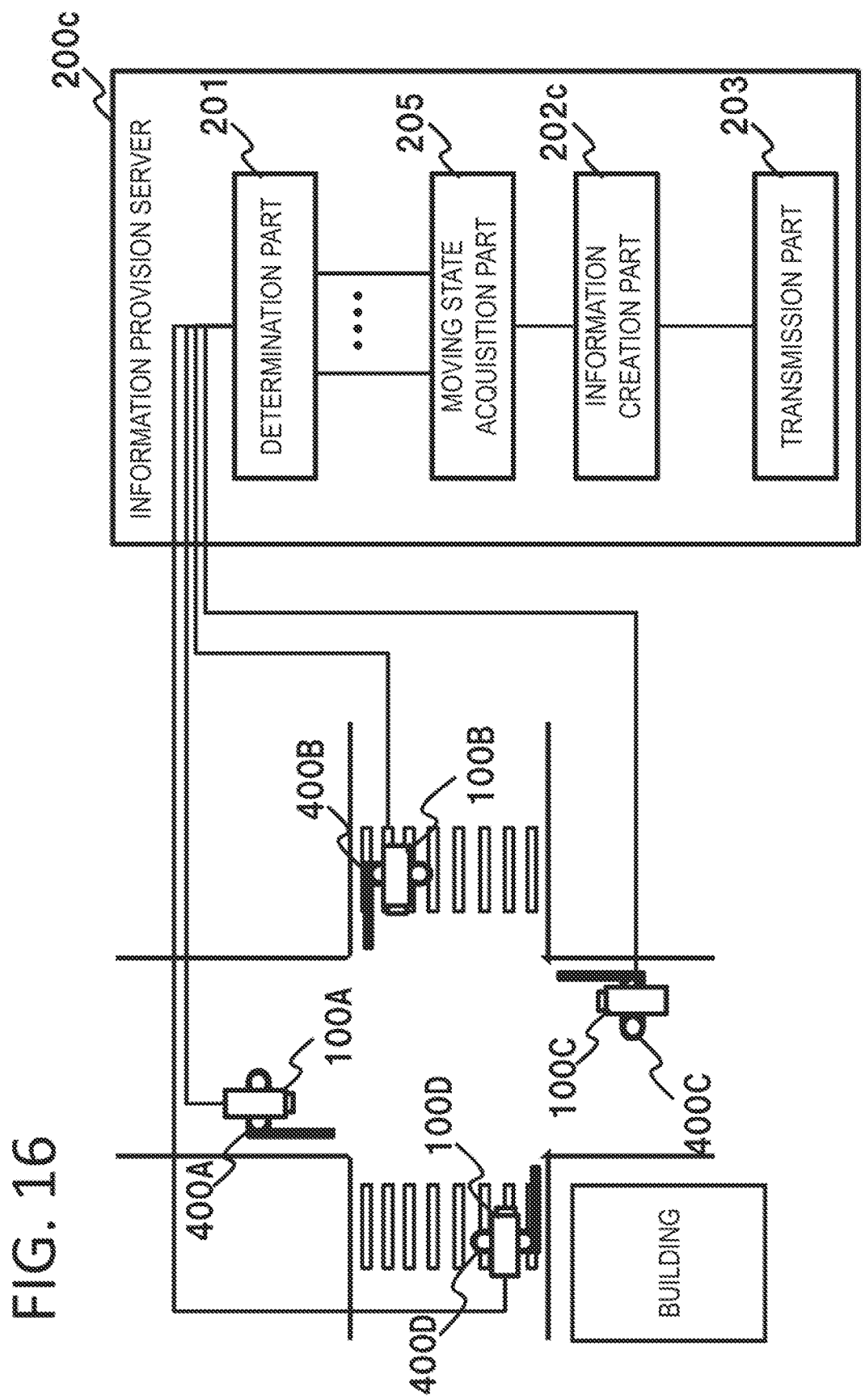
FIG. 16 is a diagram illustrating a configuration of an information provision server according to a fourth example embodiment of the present invention.

Next, a fourth example embodiment in which an information provision server provides the secondary information in view of a moving state of a mobile object will be described in detail with reference to drawings. According to the fourth example embodiment, too, the mobile objects could be various objects such as pedestrians and bicycles, other than vehicles. However, the following description will be made based on an example in which the mobile objects are vehicles. FIG. 16 is a diagram illustrating a configuration of an information provision server according to the fourth example embodiment of the present invention. The present configuration differs from the configuration according to the first example embodiment illustrated in FIG. 2 in that an information provision server 200c further includes a moving state acquisition section 205 and in that an information creation part 202c creates the secondary information by using information acquired by the moving state acquisition section 205. Because other aspects of the configuration are the same as those according to the first example embodiment, the following description will be made with a focus on the difference.

The moving state acquisition section 205 of the information provision server 200c acquires a moving state of the first mobile object (vehicle CAR1) captured by the cameras 100A to 100D. This "moving state" refers to a state of the traveling of the mobile object, and includes, for example, the traveling direction or the speed of the mobile object. The following description will be made based on an example in which the traveling direction is acquired as the moving state. As a method for acquiring the moving state of the first mobile object (vehicle CAR1), it is possible to adopt a method in which the traveling direction may be estimated from the movement of an image of the first mobile object (vehicle CAR1) in at least one of the camera images acquired from the cameras 100A to 100D or from information of the direction indicator. The method for acquiring the traveling direction of the first mobile object (vehicle CAR1) is not limited to this method. Various kinds of methods may be used. For example, if a designated traveling direction (for example, a right-turn lane) is set on a lane at an intersection, it is possible to adopt a method in which information about the lane on which the first mobile object (vehicle CAR1) in at least one of the camera images is located may be used to estimate the traveling direction. In addition, if the information provision server 200c can acquire driving route planning information (route information of a car navigation system) of the first mobile object (vehicle CAR1) from an in-vehicle terminal of the mobile object, which is a vehicle, the information provision server 200c may use the driving route planning information to estimate the traveling direction. If the information provision server 200c can acquire the steering angle of the mobile object, which is a vehicle, the information provision server 200c may use the steering angle to estimate the traveling direction of the first mobile object (vehicle CAR1). In addition, if a designated traveling direction (for example, a combination of a red light and a right arrow) is set as the lighting pattern of the traffic light machine at the intersection, it is possible to adopt a method in which the information provision server 200c may use the lighting state of the traffic light machine in at least one of the camera images or control information about the traffic light machine to estimate the traveling direction of the first mobile object (vehicle CAR1).

The information creation part 202c creates the secondary information by using the traveling direction of the first mobile object (vehicle CAR1) acquired as described above, in addition to the camera images acquired by the cameras 100A to 100D. Concretely, of all the objects (second mobile objects) located in the blind spots of the first mobile object (vehicle CAR1), the information creation part 202c gives higher priorities to objects located in the traveling direction of the first mobile object (vehicle CAR1) and creates the secondary information in view of the priorities.

Next, an operation according to the present example embodiment will be described in detail with reference to drawings. FIG. 17 is a flowchart illustrating an operation of the information provision server 200c according to the fourth example embodiment of the present invention. The present operation differs from the operation according to the first example embodiment illustrated in FIG. 5 in that steps S204 and S205 are added after step S003.

If the information provision server 200c determines to provide the secondary information to the mobile object (first mobile object) (Yes in step S003), the information provision server 200c acquires the moving state of the mobile object (traveling direction information) (step S204).

Figure 18:
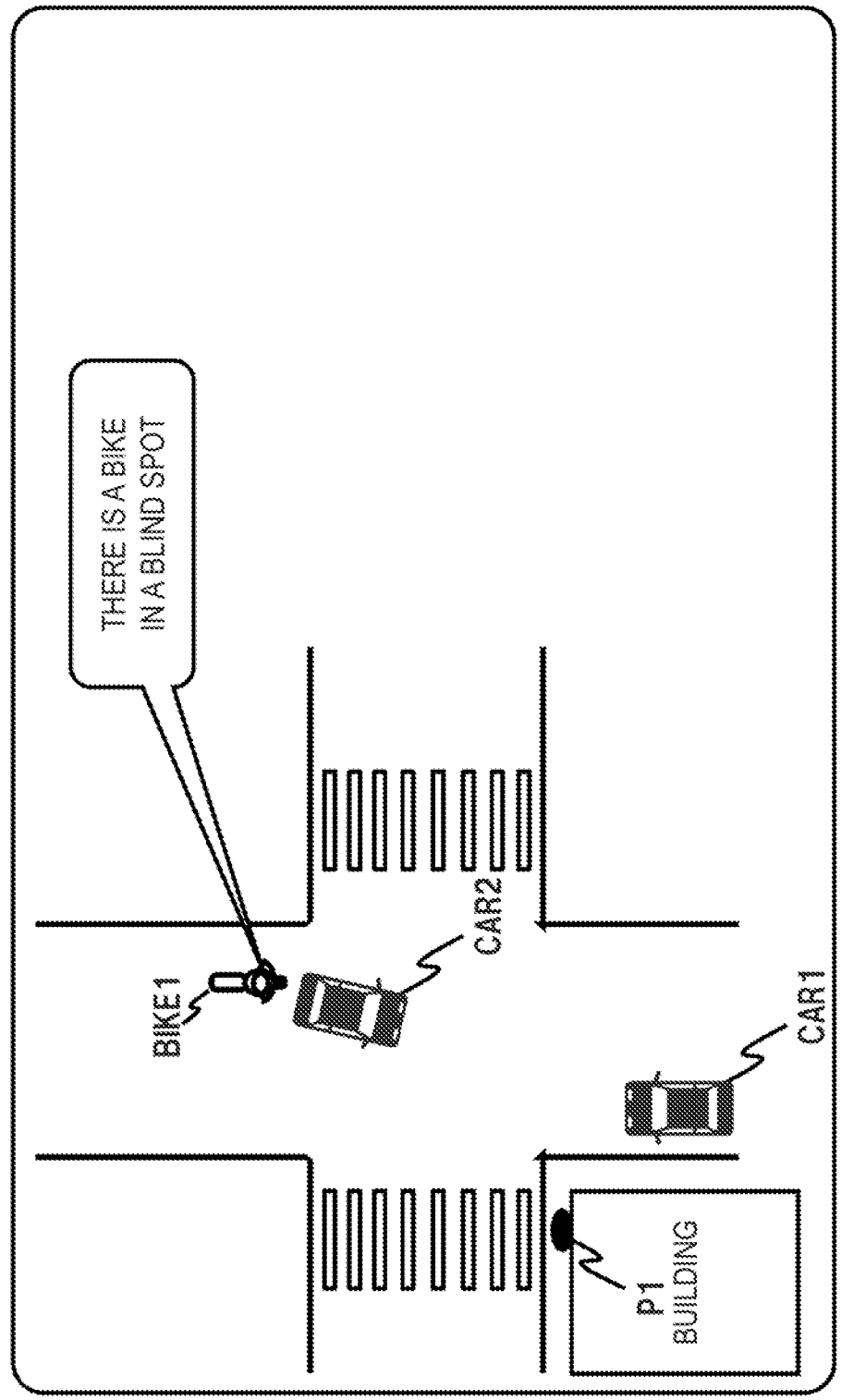
FIG. 18 is a diagram illustrating an example of secondary information provided from the information provision server to a vehicle according to the fourth example embodiment of the present invention.

Next, the information provision server 200c determines the importance levels to be given to the individual objects by using the arrangement of the objects and the moving state (traveling direction) of the mobile object (step S205). Next, the information provision server 200c creates the secondary information in view of the determined importance levels (step S004). For example, it is assumed that the moving state (traveling direction) indicating that the first mobile object (vehicle CAR1) is turning right is obtained. In this case, between the objects (BIKE1 and P1) located in the blind spots of the first mobile object (vehicle CAR1), the information provision server 200c sets a higher importance level to the two-wheeled vehicle BIKE1 located in the traveling direction of the first mobile object (vehicle CAR1), as illustrated in FIG. 18. Next, the information provision server 200c creates the secondary information strongly alerting about the two-wheeled vehicle BIKE1. In this case, the pedestrian P1 to which a lower importance level has been given may be removed from the secondary information.

The information provision server 200c according to the present example embodiment that operates as described above can further narrow down the information to be transmitted to the first mobile object (vehicle CAR1), compared with the first to third example embodiments. As a result, the driver of the first mobile object (vehicle CAR1) or an in-vehicle device therein can be notified more efficiently of the presence of a mobile object in a blind spot.

The above example embodiment has been described assuming that the secondary information is created by using the importance levels given to the individual objects. However, the use of the importance levels is not limited to the above example. For example, when the secondary information is displayed as images on an in-vehicle terminal, the individual objects may be displayed differently. The secondary information may be transmitted differently depending on magnitude of the importance level given to the object. For example, secondary information indicating the presence of an object whose importance level is high may be transmitted in a push way, without waiting for a request from the first mobile object (vehicle CAR1) (see the second example embodiment). Other information may be transmitted in response to requests from the first mobile object (vehicle CAR1).

Although the above fourth example embodiment has been described based on an example in which the traveling direction is used as the moving state, the speed of the first mobile object may be used as the moving state. The speed of the first mobile object may be acquired from a speed sensor or may be acquired by analyzing an image. In addition, if the first mobile object is a vehicle and the position of the shifter can be acquired, the speed may be estimated from information about the position of the shifter. In this way, by using information about the speed as the moving state, for example, a low importance level can be set to an object whose speed is less than or equal to a predetermined threshold (to an object that is stopped or is moving very slowly, for example).

In addition, the above fourth example embodiment as described above has been described based on an example in which the moving state of the first mobile object is acquired and taken into account. However, in place of or in addition to this moving state of the first mobile object, the moving state (traveling direction, speed, etc.,) of another mobile object (surrounding mobile object) may be acquired to create the secondary information. For example, if there are two mobile objects in blind spots of the first mobile object and each of the two mobile objects exhibits a different traveling direction or speed, different importance levels may be set based on the two different traveling directions or speeds.

Fifth Example Embodiment

Figure 19:
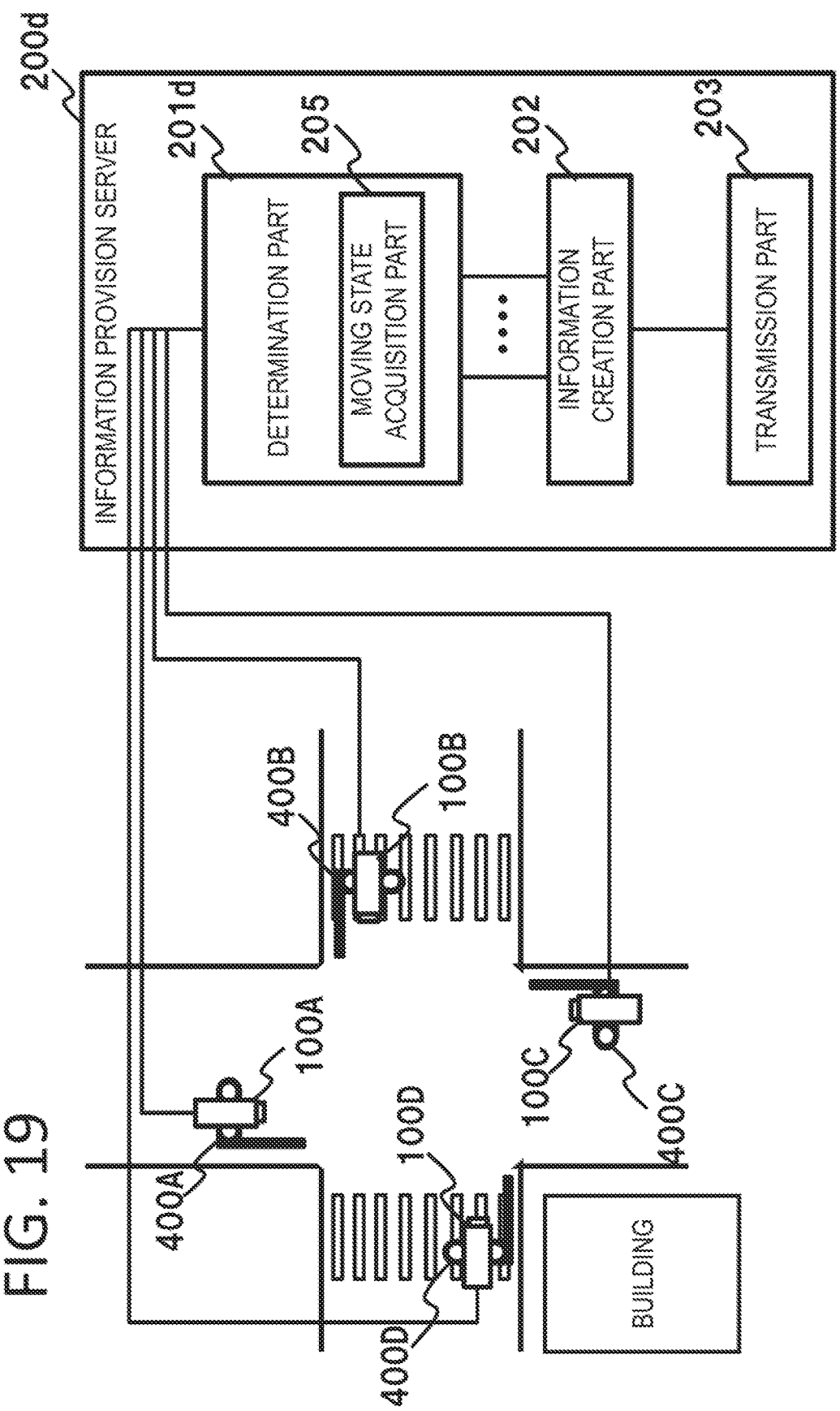
FIG. 19 is a diagram illustrating a configuration of an information provision server according to a fifth example embodiment of the present invention.

Next, a fifth example embodiment in which an information provision server determines whether or not to provide the secondary information in view of a moving state of a mobile object will be described in detail with reference to drawings. According to the fifth example embodiment, too, the mobile objects could be various objects such as pedestrians and bicycles, other than vehicles. However, the following description will be made based on an example in which the mobile objects are vehicles. FIG. 19 is a diagram illustrating a configuration of an information provision server according to the fifth example embodiment of the present invention. The present configuration differs from the configuration according to the first example embodiment illustrated in FIG. 2 in that an information provision server 200*d* includes a determination part 201*d* including a moving state acquisition part 205 and that the determination part 201*d* determines whether or not to create the secondary information by also using information acquired by the moving state acquisition part 205. Because other aspects of the configuration are the same as those according to the first example embodiment, the following description will be made with a focus on the difference.

The moving state acquisition part 205 of the information provision server 200*d* acquires a moving state (traveling direction) of the first mobile object (vehicle CAR1) taken by at least one of the cameras 100A to 100D. The method for acquiring the moving state (traveling direction) of the first mobile object (vehicle CAR1) is the same as that according to the fourth example embodiment, and the description thereof will be omitted. In addition, the following description will be made based on an example in which the traveling direction is acquired as the moving state.

The determination part 201*d* determines whether or not to provide the secondary information by using the moving state (traveling direction) of the first mobile object (vehicle CAR1) acquired as described above, in addition to the camera images captured by the cameras 100A to 100D. Concretely, the determination part 201*d* determines whether or not to provide the secondary information by determining whether or not an object(s) in a blind spot(s) of the first mobile object (vehicle CAR1) is located in the traveling direction of the first mobile object (vehicle CAR1).

Figure 20:
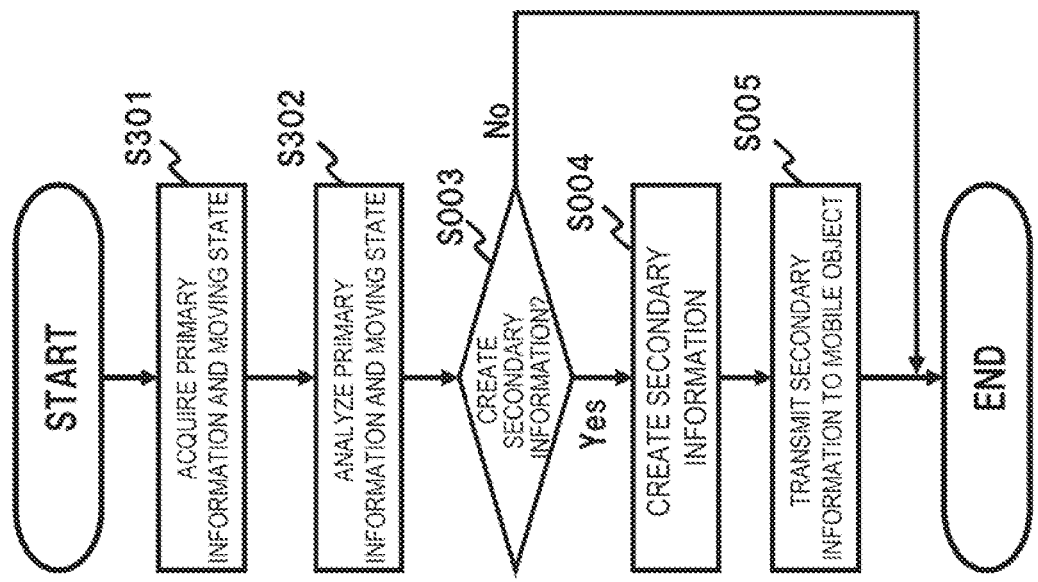
FIG. 20 is a flowchart illustrating an operation of the information provision server according to the fifth example embodiment of the present invention.

Next, an operation according to the present example embodiment will be described in detail with reference to drawings. FIG. 20 is a flowchart illustrating an operation of the information provision server 200*d* according to the fifth example embodiment of the present invention. The present operation differs from the operation according to the first example embodiment illustrated in FIG. 5 in that the moving state is acquired in addition to the primary information in step S301 and that the moving state is analyzed in addition to the primary information in step S302.

For example, if a traveling direction indicating that the first mobile object (vehicle CAR1) is turning right is acquired, because, between the objects (BIKE1 and P1) located in blind spots of the first mobile object (vehicle CAR1), the two-wheeled vehicle BIKE1 is located in the traveling direction of the vehicle CAR1 as illustrated in FIG. 18, the information provision server 200*d* determines that it is necessary to provide the secondary information. In contrast, if both of the objects located in the blind spots of the first mobile object (vehicle CAR1) are not located in the traveling direction of the first mobile object (vehicle CAR1), the information provision server 200*d* determines it is not necessary to provide the secondary information.

The information provision server 200*d* according to the present example embodiment that operates as described above can further narrow down the information to be transmitted to the first mobile object (vehicle CAR1), compared with the first to fourth example embodiments. As a result, the driver of the first mobile object (vehicle CAR1) or an in-vehicle device therein can be notified more efficiently of the presence of a mobile object in a blind spot.

Although the above fifth example embodiment has been described based on an example in which the traveling direction is used as the moving state, the speed of the first mobile object may be used as the moving state. The speed of the first mobile object may be acquired from a speed sensor or may be acquired by analyzing an image. In addition, if the first mobile object is a vehicle and the position of the shifter can be acquired, the speed may be estimated from information about the position of the shifter. For example, when the speed is less than or equal to a predetermined threshold or less (when the vehicle is stopped or is running very slowly, for example), the information provision server 200*d* may determine that it is not necessary to provide the secondary information.

In addition, the above fifth example embodiment has been made based on an example in which the moving state of the first mobile object is acquired and taken into account. However, in place of or in addition to this moving state of the first mobile object, the moving state (traveling direction, speed, etc.,) of another mobile object (surrounding mobile object) may be acquired to determine whether or not to provide the secondary information. For example, if there is a mobile object(s) in a blind spot(s) of the first mobile object, the traveling direction(s) or the speed(s) of the mobile object(s) may be acquired, and the information provision server 200*d* may determine whether or not to provide the secondary information, depending on the traveling direction(s) or the speed(s).

Sixth Example Embodiment

Figure 21:
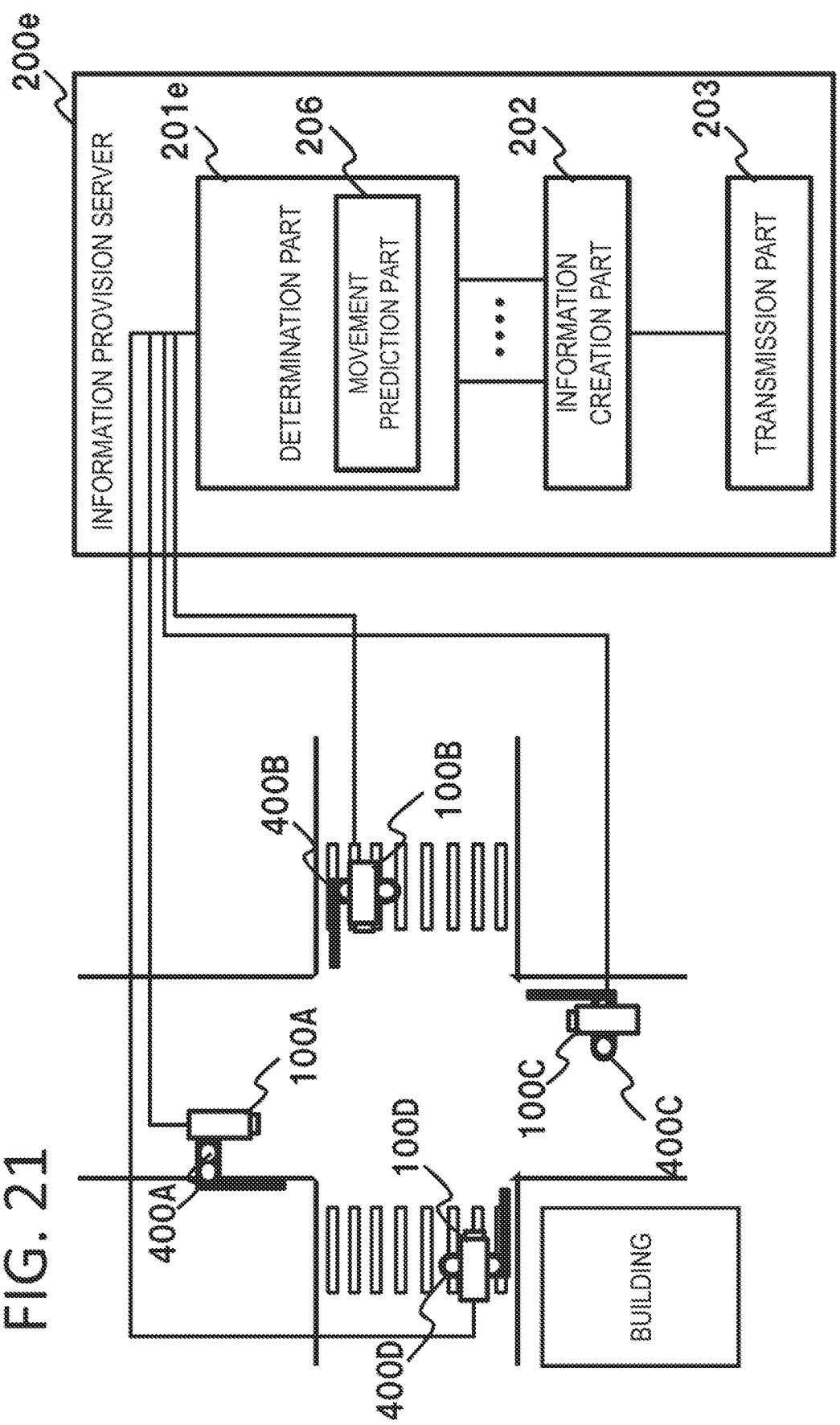
FIG. 21 is a diagram illustrating a configuration of an information provision server according to a sixth example embodiment of the present invention.

Next, a sixth example embodiment in which an information provision server determines whether or not to provide the secondary information in view of a future movement(s) of a mobile object(s) will be described in detail with reference to drawings. According to the sixth example embodiment, too, the mobile objects could be various objects such as pedestrians and bicycles, other than vehicles. However, the following description will be made based on an example in which the mobile objects are vehicles. FIG. 21 is a diagram illustrating a configuration of an information provision server according to the sixth example embodiment of the present invention. The present configuration differs from the configuration according to the first example embodiment illustrated in FIG. 2 in that an information provision server 200e includes a determination part 201e including a movement prediction part 206 and that the determination part 201e determines whether or not to create the secondary information by also using information acquired by the movement prediction part 206. Because other aspects of the configuration are the same as those according to the first example embodiment, the following description will be made with a focus on the difference.

The movement prediction part 206 of the information provision server 200e predicts the movement of the first mobile object (vehicle CAR1) from the state of the first mobile object (vehicle CAR1) taken by at least one of the cameras 100A to 100D. As a method for predicting the movement of the first mobile object (vehicle CAR1), it is possible to adopt a method in which the movement after a predetermined time has passed from the image of the first mobile object (vehicle CAR1) in the camera images acquired from the cameras 100A to 100D may be predicted. The method for predicting the movement of the first mobile object (vehicle CAR1) is not limited to this example. Any one of various kinds of methods may be used. For example, if the information provision server 200e can acquire the first mobile object (vehicle CAR1) (instrument information about vehicle CAR1 (the steering angle, speedometer, GPS information, etc.)) from an in-vehicle terminal of the first mobile object, the movement prediction part 206 may predict the movement after a predetermined time has passed by using these items of information. In addition, if it is possible to acquire the lighting state of the traffic light machine at the intersection and control information about the traffic light machine, it is possible to adopt a method in which the movement prediction part 206 may predict the movement of the first mobile object (vehicle CAR1) by using these items of information. For example, if the light of the traffic light machine located in the traveling direction of the first mobile object (vehicle CAR1) is red, the movement prediction part 206 can predict that the first mobile object (vehicle CAR1) will not move for a while. If, for example, the movement prediction part 206 has acquired information indicating that the light of the traffic light machine located in the traveling direction of the first mobile object (vehicle CAR1) will soon change to green, the movement prediction part 206 can predict that the first mobile object (vehicle CAR1) will start to move in a predetermined time. If, for example, the first mobile object is a vehicle and if the movement prediction part 206 can acquire the driving route planning information (the route information of the car navigation system) of the first mobile object, the movement prediction part 206 may predict the movement of the first mobile object by using the driving route planning information. If, for example, a designated traveling direction (for example, a right-turn lane) is set for a lane at an inter part, it is possible to use a method in which the movement prediction part 206 may predict the movement of the first mobile object by using information about the lane on which the first mobile object (vehicle CAR1) in at least one of the camera images is located.

The determination part 201e determines whether or not to provide the secondary information by using the future movement of the first mobile object (vehicle CAR1) acquired as described above, in addition to the camera images taken by the cameras 100A to 100D. Concretely, the determination part 201e determines whether or not to provide the secondary information by determining not only whether or not an object(s) is present in a blind spot(s) of the first mobile object (vehicle CAR1) but also whether or not the first mobile object (vehicle CAR1) will be in a stopped state for a while.

Figure 22:
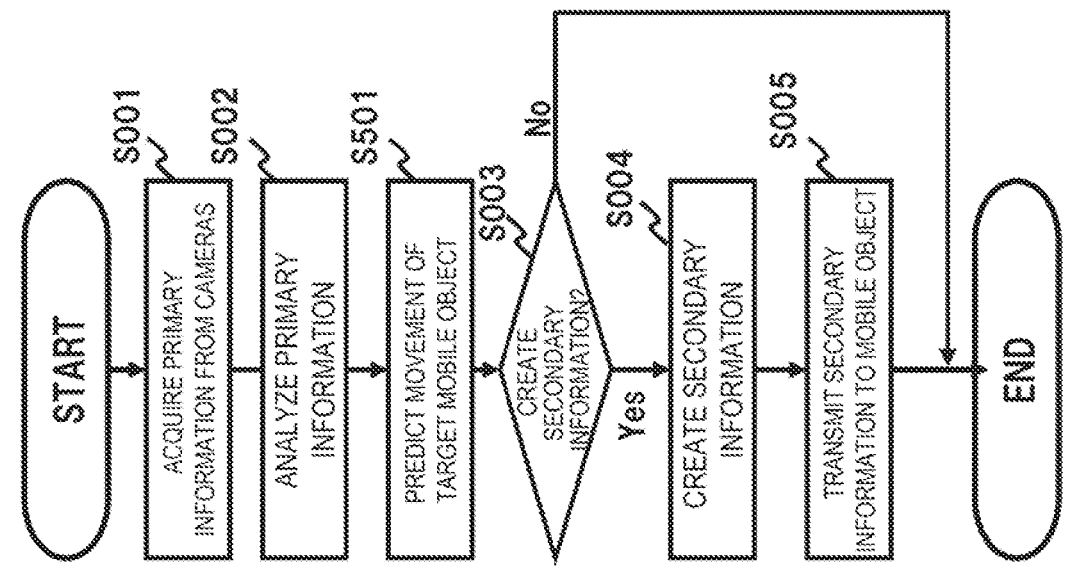
FIG. 22 is a flowchart illustrating an operation of the information provision server according to the sixth example embodiment of the present invention.

Next, an operation according to the present example embodiment will be described in detail with reference to drawings. FIG. 22 is a flowchart illustrating an operation of the information provision server 200e according to the sixth example embodiment of the present invention. The present operation differs from the operation according to the first example embodiment illustrated in FIG. 5 in that step S501 for predicting the movement of the mobile object is added after step S002.

For example, if the information provision server 200e has acquired a prediction result indicating that the first mobile object (vehicle CAR1) will be stopped for a while, the information provision server 200e determines that it is not necessary to provide the secondary information, irrespective of whether or not there is an object(s) in a blind spot(s) of the first mobile object (vehicle CAR1). If the first mobile object (vehicle CAR1) is moving or if the information provision server 200e has acquired a prediction result indicating that the first mobile object (vehicle CAR1) will start to move within a short time, the information provision server 200e determines that is it necessary to provide the secondary information.

The information provision server 200e according to the present example embodiment that operates as described above can further narrow down the information to be transmitted to the first mobile object (vehicle CAR1), compared with the first to fifth example embodiments. As a result, the driver of the first mobile object (vehicle CAR1) or an in-vehicle device therein can be notified more efficiently of the presence of a mobile object in a blind spot.

In addition, the above sixth example embodiment has been described based on an example in which the moving state of the first mobile object is acquired and taken into account. However, in place of or in addition to this moving state of the first mobile object, the future movement of another mobile object (surrounding mobile object) may be predicated to create the secondary information. For example, if there are two mobile objects in blind spots of the first mobile object and each of the two mobile objects exhibits a different future movement, different importance levels may be set based on the different future movements.

Seventh Example Embodiment

Figure 23:
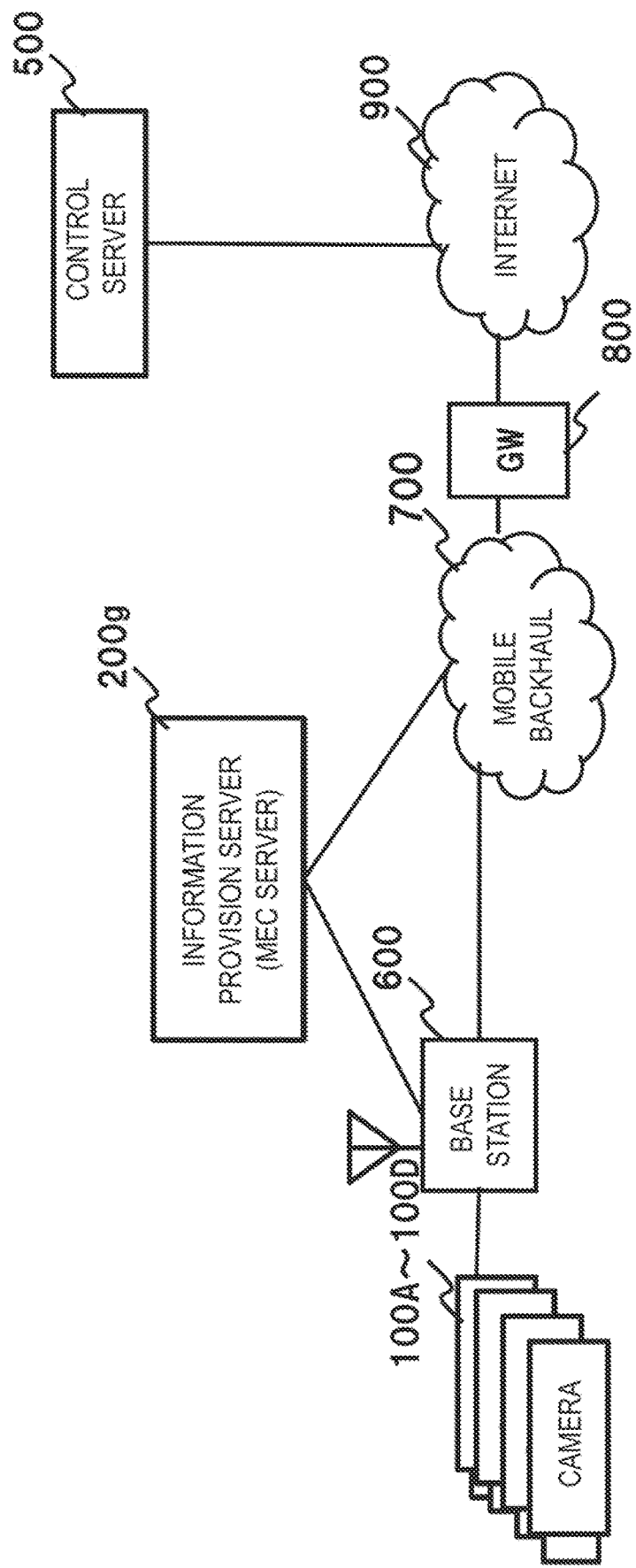
FIG. 23 is a diagram illustrating a configuration according to a seventh example embodiment of the present invention.

Next, a seventh example embodiment in which an information provision server functions as a MEC (Mobile Edge Computing/Multi-access Edge Computing) server will be described in detail with reference to drawings. FIG. 23 is a diagram illustrating a configuration according to the seventh example embodiment of the present invention. The present configuration differs from the configuration according to the first example embodiment illustrated in FIG. 2, or the like, in that an information provision server 200g is disposed at an edge of a side of the cameras 100A to 100D in a network in which the primary information acquired from each of the cameras 100A to 100D is transmitted to a predetermined control server 500.

FIG. 23 illustrates a configuration in which the cameras 100A to 100D are connected to the control server 500 via a base station 600, a mobile backhaul 700, a gateway (GW) 800, and an Internet 900.

In addition to the functions as a normal base station, the base station 600 transmits the camera images taken by the cameras 100A to 100D to the control server 500 and the information provision server 200g. The control server 500 performs information processing necessary for its control operations, by using the camera images captured by the cameras 100A to 100D.

The information provision server 200g performs the same operation as that according to the first example embodiment by using the camera images captured by the cameras 100A to 100D received from the base station 600, creates secondary information, and as needed, transmits the secondary information to the mobile object (first mobile object) via the base station 600. Thus, the information provision server 200g functions as a kind of a mobile edge computing server (MEC server). Because the configurations of the mobile backhaul 700, the gateway (GW) 800, and the Internet 900 are well known to those skilled in the art, the description thereof will be omitted.

The configuration according to the present example embodiment can achieve provision of the secondary information to the mobile object (first mobile object) as an add-on to an existing traffic control system. In addition, as described above, since the information provision server 200g is disposed at an edge of a side of the cameras 100A to 100D in the network in which the primary information is transmitted to the predetermined control server 500, the configuration is advantageous in that the processing delay is less than that of a configuration in which the control server 500 is caused to perform provision of equivalent secondary information.

While example embodiments of the present invention have thus been described, the present invention is not limited thereto. Further variations, substitutions, or adjustments can be made without departing from the basic technical concept of the present invention. For example, the configurations of the networks and elements and the representation modes of the data illustrated in the drawings have been used only as examples to facilitate understanding of the present invention. That is, the present invention is not limited to the configurations illustrated in the drawings. For example, although the above example embodiments have been described based on an example in which two cameras are disposed such that the imaging directions thereof are perpendicular to each other, the number of cameras and the arrangement thereof are not limited to the above example.

In addition, among the above first to seventh example embodiments, features of at least two freely selected example embodiments may be combined with each other, to configure a different example embodiment. For example, the second example embodiment and the third example embodiment may be combined with each other, to obtain an information provision server that determines an information transmission destination of the first mobile object and that uses an image taken by a camera of a surrounding mobile object as one sensor.

Figure 24:
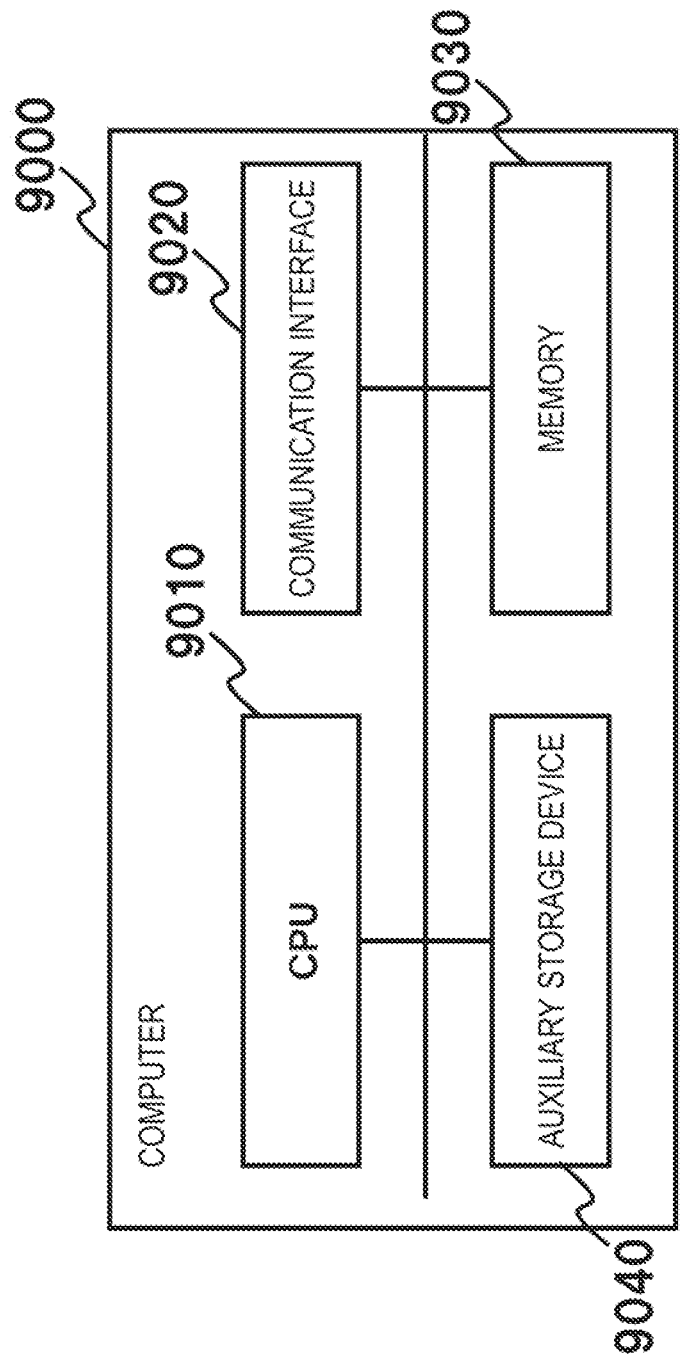
FIG. 24 is a diagram illustrating a configuration of a computer that makes up an information provision server according to the present invention.

In addition, the procedures described in the above first to seventh example embodiments can each be realized by a program that causes a computer (9000 in FIG. 24) functioning as the corresponding one of the information provision servers 200 to 200g to function as the corresponding one of the information provision servers 200 to 200g. This computer is exemplified by a configuration including a CPU (Central Processing Unit) 9010, a communication interface 9020, a memory 9030, and an auxiliary storage device 9040 as shown in FIG. 24. That is, the CPU 9010 in FIG. 24 performs a data processing program and a data transmission program and performs processing for updating various calculation parameters stored in the auxiliary storage device 9040, etc.

That is, the individual parts (processing parts, functions) of each of the information provision servers 200 to 200g according to the above example embodiments can each be realized by a computer program that causes a processor mounted in the corresponding one of the information provision servers 200 to 200g to use corresponding hardware and to execute the corresponding processing as described above.

Finally, suitable modes of the present invention will be summarized.

[Mode 1]
(See the Information Provision Server According to the Above First Aspect)

[Mode 2]
The determination part of the above information provision server may determine whether or not to provide the secondary information based on at least one of whether or not there is a second mobile object(s) around the first mobile object, the second mobile object(s) being difficult to detect by the first mobile object, a kind(s) of the second mobile object(s), and a movement attribute(s) of the second mobile object(s) and may determine to provide the secondary information if the determination part determines that there is a second mobile object(s) around the first mobile object, the second mobile object(s) being difficult to detect by the first mobile object.

[Mode 3]
The determination part of the above information provision server may determine an object(s) that is present in a sensing range(s) of the plurality of sensors from the primary information acquired from the plurality of sensors, may extract the second mobile object(s) that is present in a blind spot(s) of the first mobile object from locations of the identified object(s) and the first mobile object, and may determine whether or not to provide the secondary information based on information about the extracted second mobile object(s), and the information creation part may create information including the information about the second mobile object(s) as the secondary information.

[Mode 4]
The above information provision server may determine sameness, among the plurality of sensors, about an object(s) included in the primary information acquired from the plurality of sensors and may create the secondary information based on a determination result about the sameness.

[Mode 5]
The above information provision server may further include an address acquisition part for performing individual identification of the first mobile object by using the primary information and acquiring a communication address allocated to the first mobile object based on a result of the individual identification, and the transmission part may transmit the secondary information to the communication address.

[Mode 6]

The determination part of the above information provision server may determine whether or not to provide the secondary information, based on locational information included in a message received from the first mobile object, and the transmission part may transmit the secondary information to a communication address of the transmission source of the message.

[Mode 7]

The sensors connected to the above information provision server may include at least one of sensors installed at the road and a sensor provided a mobile object running on the road.

[Mode 8]

The above information provision server may be able to further acquire a moving state(s) of a mobile object(s) running on the road; and the determination part may determine whether or not to provide the secondary information to the first mobile object by using the moving state(s).

[Mode 9]

The above information provision server may be able to further acquire a moving state(s) of a mobile object(s) running on the road; and the information creation part may obtain an importance level(s) of the respective second mobile object(s) by using the moving state(s) and create the secondary information in view of the importance level(s).

[Mode 10]

The above information provision server may use, as the moving state(s), at least one of a lighting state(s) of a nearby traffic light machine(s), driving route planning information about a mobile object(s) running on the road, information about a lane(s) on the road on which a mobile object(s) is running, and information about a speed(s) of a mobile object(s) running on the road.

[Mode 11]

The determination part of the above information provision server may predict movement of a mobile object(s) running on the road and may determine whether or not to provide the secondary information to a mobile object(s) running on the road by using a prediction result(s) of the movement.

[Mode 12]

The determination part of the above information provision server may predict movement of a mobile object(s) running on the road, may obtain an importance level(s) of the respective second mobile object(s) by using a prediction result(s) of the movement, and may create the secondary information in view of the importance level(s).

[Mode 13]

The determination part of the above information provision server may predict movement of a mobile object(s) running on the road based on at least one of a lighting state(s) of a nearby traffic light machine(s), driving route planning information about a mobile object(s) running on the road, information about a lane(s) on the road on which a mobile object(s) is running, and information about a speed(s) of a mobile object(s) running on the road.

[Mode 14]

The above information provision server may be disposed at an edge at a side of the sensors in a network in which the primary information acquired from an individual one of the plurality of sensors is transmitted to a predetermined control server.

[Mode 15]

(See the Information Provision Method According to the Above Second Aspect)

[Mode 16]

(See the Program According to the Above Third Aspect)

The above modes 15 and 16 can be expanded in the same way as Mode 1 is expanded to modes 2 to 14.

The disclosure of each of the above Patent Literatures is incorporated herein by reference thereto and is considered to be described therein, and can be used as a basis and a part of the present invention if needed. Variations and adjustments of the example embodiments and examples are possible within the scope of the overall disclosure (including the claims) of the present invention and based on the basic technical concept of the present invention. Various combinations and selections (including partial deletion) of various disclosed elements (including the elements in each of the claims, example embodiments, examples, drawings, etc.) are possible within the scope of the entire disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not particularly mentioned. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST 10 sensor
20, 200, 200a to 200g information provision server
21, 201, 201a to 201e determination part
22, 202, 202c information creation part
23, 203, 203a transmission part
100-1, 100-2, 100A to 100E camera
204 address acquisition part
205 moving state acquisition part
206 movement prediction part
300 mobile object management server
400A to 400D traffic light machine
500 control server
600 base station
700 mobile backhaul
800 gateway (GW)
900 Internet
CAR1 to CAR2 vehicle
BIKE1 two-wheeled vehicle
P1 pedestrian
obj0 to obj2 object/image
9000 computer
9010 CPU
9020 communication interface
9030 memory
9040 auxiliary storage device

The invention claimed is:

1. An information provision server, comprising:
at least a processor; and
a memory in circuit communication with the processor,
wherein the processor is configured to execute program instructions stored in the memory to perform:
based on primary information acquired from a plurality of sensing a predetermined range of a road, determining whether or not to provide secondary information created by using the primary information to a first mobile object running on the road;

upon determining to provide the secondary information to the first mobile object, creating the secondary information by using the primary information acquired from the plurality of sensors;

transmitting the secondary information to the first mobile object;

running individual identification of the first mobile object by using the primary information;

acquiring a communication address allocated to the first mobile object based on a result of the individual identification; and transmitting the secondary information to the communication address, wherein the sensors include at least one of a sensor installed at the road and a sensor mounted on a mobile object running on the road.

2. The information provision server according to claim 1, wherein the processor is further configured to execute program instruction to perform:

determining whether or not to provide the secondary information based on at least one of a presence of a second mobile object(s) object(s), a kind(s) of the second mobile object(s), and a movement attribute(s) of the second mobile object(s), the second mobile object(s) being around the first mobile object and difficult to detect by the first mobile object.

3. The information provision server according to claim 2, wherein the processor is further configured to execute program instructions to perform:

from the primary information acquired from the plurality of sensors, identifying an object(s) that is present in a sensing range(s) of the plurality of sensors;

from locations of the identified object(s) and the first mobile object, extracting the second mobile object(s) that is present in a blind spot(s) of the first mobile object:

determining whether or not to provide the secondary information based on information about the extracted second mobile object(s); and creating information including the information about the second mobile object(s) as the secondary information.

4. The information provision server according to claim 1, wherein the processor is further configured to execute program instructions to perform:

determining sameness, among the plurality of sensors, about an object(s) included in the primary information acquired from the plurality of sensors; and creating the secondary information based on a determination result about the sameness.

5. The information provision server according to claim 1, the processor is further configured to execute the program instructions to perform:

determining whether or not to provide the secondary information, based on locational information included in a message received from the first mobile object; and transmitting the secondary information to a communication address of the transmission source of the message.

6. The information provision server according to claim 1, wherein the processor is further configured to execute the program instructions to perform:

acquiring a moving state(s) of a mobile object(s) running on the road; and determining whether or not to provide the secondary information to the first mobile object by using the moving state(s).

7. The information provision server according to claim 2, wherein the processor is further configured to execute the program instructions to perform:

acquiring a moving state(s) of a mobile object(s) running on the road; and obtaining an importance level(s) of the respective second mobile object(s) by using the moving state(s); and creating the secondary information in view of the importance level(s).

8. The information provision server according to claim 6, wherein the moving state(s) is generated based on at least one of a lighting state(s) of a nearby traffic light machine(s), driving route planning information about a mobile object(s) running on the road, information about a lane(s) on the road on which a mobile object(s) is running, and information about a speed(s) of a mobile object(s) running on the road.

9. The information provision server according to claim 1, wherein the processor is further configured to execute the program instructions to perform:

predicting movement of a mobile object(s) running on the road; and determining whether or not to provide the secondary information to a mobile object(s) running on the road by using a prediction result(s) of the movement.

10. The information provision server according to claim 2, wherein the processor is further configured to execute the program instructions to perform:

predicting movement of a mobile object(s) running on the road, obtaining an importance level(s) of the respective second mobile object(s) by using a prediction result(s) of the movement, and creating the secondary information in view of the importance level(s).

11. The information provision server according to claim 9, wherein the processor is further configured to execute the program instructions to perform: predicting movement of a mobile object(s) running on the road based on at least one of a lighting state(s) of a nearby traffic light machine(s), driving route planning information about a mobile object(s) running on the road, information about a lane(s) on the road on which a mobile object(s) is running, and information about a speed(s) of a mobile object(s) running on the road.

12. The information provision server according to claim 1, wherein the information provision server is disposed at an edge at a side of the sensors in a network in which the primary information is transmitted to a predetermined control server.

13. An information provision method, in which a computer that is able to acquire primary information from a plurality of sensors sensing a predetermined range of a road, comprising based on the primary information acquired from the plurality of sensors, determining whether or not to provide secondary information created by using the primary information to a first mobile object running on the road;

upon determining to provide the secondary information to the first mobile object, creating the secondary information by using the primary information acquired from the plurality of sensors;

transmitting the secondary information to the first mobile object, running individual identification of the first mobile object by using the primary information, acquiring a communication address allocated to the first mobile object based on a result of the individual identification; and transmitting the secondary information to the communication address, wherein the sensors include at least one of a sensor installed at the road and a sensor mounted on a mobile object running on the road.

14. A computer-readable non-transient recording medium recording a program, the program causing a computer that is able to acquire information from a plurality of sensors sensing a predetermined range of a road, to perform processings of:

based on primary information acquired from the plurality of sensors, determining whether or not to provide secondary information created by using the primary information to a first mobile object running on the road;

upon determining to provide the secondary information to the first mobile object, creating the secondary information by using the primary information acquired from the plurality of sensors;

transmitting the secondary information to the first mobile object;

running individual identification of the first mobile object by using the primary information;

acquiring a communication address allocated to the first mobile object based on a result of the individual identification; and transmitting the secondary information to the communication address, wherein the sensors include at least one of a sensor installed at the road and a sensor mounted on a mobile object running on the road.

15. The information provision method according to claim 13, wherein the computer further determines whether or not to provide the secondary information based on at least one of a presence of a second mobile object(s), a kind(s) of the second mobile object(s), and a movement attribute(s) of the second mobile object(s), the second mobile object(s) being around the first mobile object and difficult to detect by the first mobile object.

16. The information provision method according to claim 15, wherein the computer further identifies, from the primary information acquired from the plurality of sensors, an object(s) that is present in a sensing range(s) of the plurality of sensors;

from locations of the identified object(s) and the first mobile object, extracts the second mobile object(s) that is present in a blind spot(s) of the first mobile object;

determines whether or not to provide the secondary information based on information about the extracted second mobile object(s); and creates information including the information about the second mobile object(s) as the secondary information.

17. The medium according to claim 14, the program further causing the computer to determine whether or not to provide the secondary information based on at least one of a presence of a second mobile object(s), a kind(s) of the second mobile object(s), and a movement attribute(s) of the second mobile object(s), the second mobile object(s) being around the first mobile object and difficult to detect by the first mobile object.

18. The medium according to claim 17, the program further causing the computer to:

from the primary information acquired from the plurality of sensors, identify an object(s) that is present in a sensing range(s) of the plurality of sensors;

from locations of the identified object(s) and the first mobile object, extract the second mobile object(s) that is present in a blind spot(s) of the first mobile objects;

determine whether or not to provide the secondary information based on information about the extracted second mobile object(s); and create information including the information about the second mobile object(s) as the secondary information.

19. The information provision server according to claim 1, wherein the processor is further configured to execute program instruction to perform:

acquiring traveling direction information of the first mobile object; and upon determining to provide the secondary information to the first mobile object, creating the secondary information by using the primary information acquired from the plurality of sensors and the traveling direction information.

20. The information provision server according to claim 19, wherein the processor is further configured to execute program instruction to perform:

determining importance levels to be given to individual objects detected by the sensors; and creating the secondary information based on the importance levels.

* * * * *